US009052339B2

(12) United States Patent
Williams et al.

(10) Patent No.: US 9,052,339 B2
(45) Date of Patent: Jun. 9, 2015

(54) MEASUREMENT OF DEPTH AND ENERGY OF BURIED TRAP STATES IN DIELECTRIC FILMS BY SINGLE ELECTRON TUNNELING FORCE SPECTROSCOPY

(71) Applicant: The University of Utah Research Foundation, Salt Lake City, UT (US)

(72) Inventors: Clayton Covey Williams, Salt Lake City, UT (US); Jon Paul Johnson, Salt Lake City, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 14/448,866

(22) Filed: Jul. 31, 2014

(65) Prior Publication Data

US 2014/0345007 A1 Nov. 20, 2014

Related U.S. Application Data

(63) Continuation of application No. PCT/US2013/024129, filed on Jan. 31, 2013.

(60) Provisional application No. 61/593,103, filed on Jan. 31, 2012.

(51) Int. Cl.
  *G01Q 60/12* (2010.01)
  *B82Y 35/00* (2011.01)
  *G01Q 60/14* (2010.01)

(52) U.S. Cl.
  CPC ............. *G01Q 60/12* (2013.01); *B82Y 35/00* (2013.01); *G01Q 60/14* (2013.01)

(58) Field of Classification Search
  USPC .......................................... 850/4, 27; 73/105
  See application file for complete search history.

(56) References Cited

U.S. PATENT DOCUMENTS

| 5,378,983 | A |  | 1/1995 | Yagi et al. |
| 6,845,655 | B2 | * | 1/2005 | van der Weide et al. ........ 73/105 |
| 7,574,327 | B2 | * | 8/2009 | de Roover et al. ............ 702/189 |
| 2004/0144929 | A1 |  | 7/2004 | Edman et al. |
| 2005/0139768 | A1 |  | 6/2005 | Bloess |
| 2006/0225164 | A1 |  | 10/2006 | Williams et al. |
| 2010/0128342 | A1 | * | 5/2010 | Abramovitch ................ 359/325 |

FOREIGN PATENT DOCUMENTS

WO    WO 92-11528    7/1992

OTHER PUBLICATIONS

International Search Report Issued in PCT/US2013/024129 on May 15, 2013.

* cited by examiner

*Primary Examiner* — Kiet T Nguyen
(74) *Attorney, Agent, or Firm* — Stoel Rives LLP

(57) ABSTRACT

A single electron tunneling force spectroscopy (SETFS) system (10) can perform a series of surface potential charge measurements at an array of voltages (V) and tip-sample heights (Z). These measurements are combined with a tunneling model that includes the dependence of the tunneling probability on trap state depth and energy. Simultaneous measurement of the depth and energy of individual trap states in a sample, such as a dielectric film, with an atomic scale of spatial resolution can be achieved. When combined with two-dimensional trap state imaging, such techniques provide for three-dimensional imaging of electronic defect states with atomic scale spatial resolution.

42 Claims, 13 Drawing Sheets

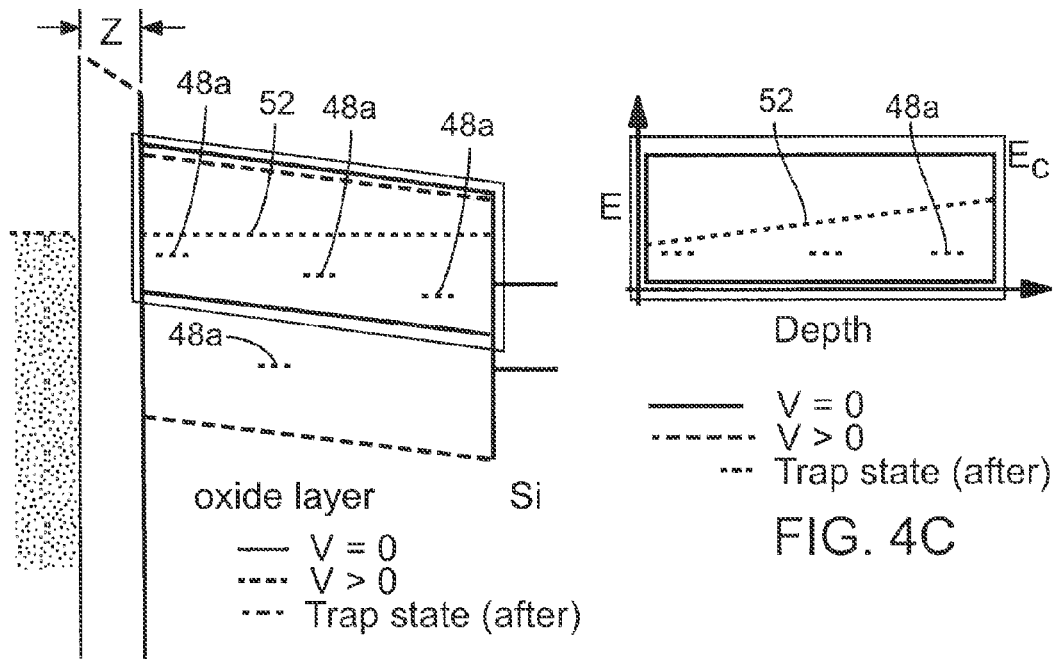
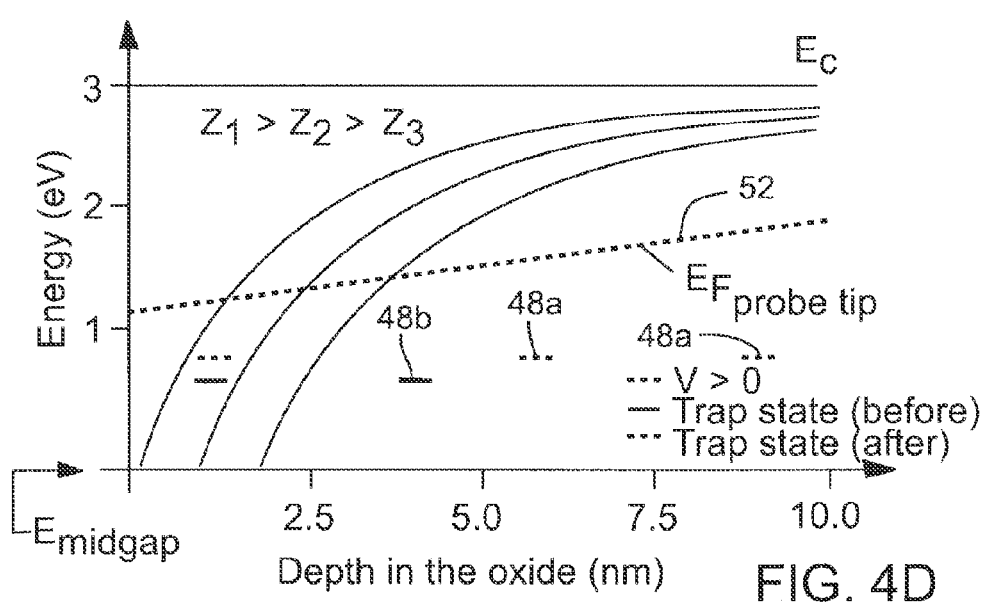

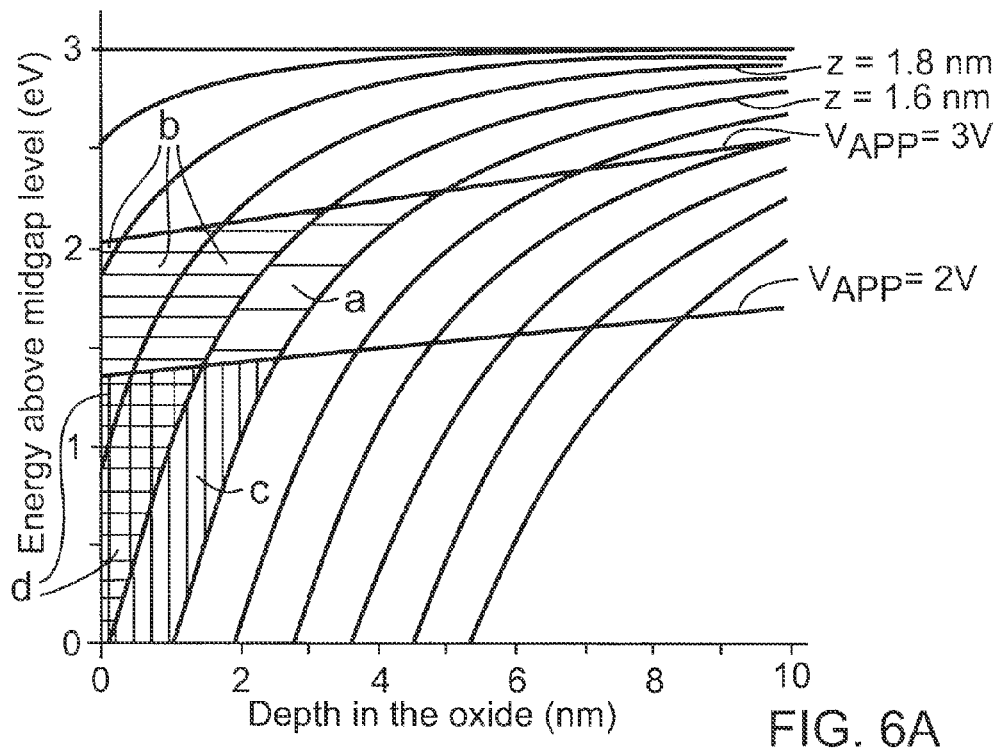
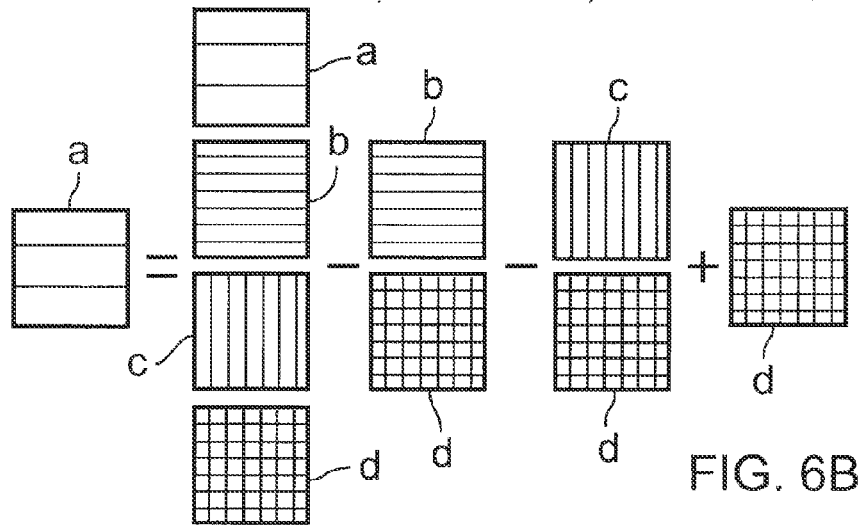
FIG. 6A
$Q_a = Q_{3V, 1.6\,nm} - Q_{2V, 1.6\,nm} - Q_{3V, 1.8\,nm} + Q_{3V, 1.6\,nm}$
FIG. 6B

MEASUREMENT OF DEPTH AND ENERGY OF BURIED TRAP STATES IN DIELECTRIC FILMS BY SINGLE ELECTRON TUNNELING FORCE SPECTROSCOPY

RELATED APPLICATIONS

This application is a continuation of International Patent Application No. PCT/US2013/024129, filed Jan. 31, 2013, which claims the benefit of U.S. Provisional Patent Application No. 61/593,103, filed Jan. 31, 2012, both of which are herein incorporated by reference in their entirety including attachments and appendices.

TECHNICAL FIELD

This application relates to characterization of electronic trap states and, in particular, to methods and apparatus for measuring depth and energy of individual trap states in a sample substrate, such as a dielectric material.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

FIGS. 4A-4F are energy-depth diagrams illustrating the influence of applied voltages on tunneling conditions and analyses for correcting energy and depth determinations made under an applied voltage.

FIG. 6A is an energy-depth diagram that employs modeled tunneling curves.

FIG. 6B provides an exemplary equation and pictorial representation of a tunneling charge algorithm in an example for two consecutive applied voltages and probe tip heights.

DETAILED DESCRIPTION OF EMBODIMENTS

Figure 1:
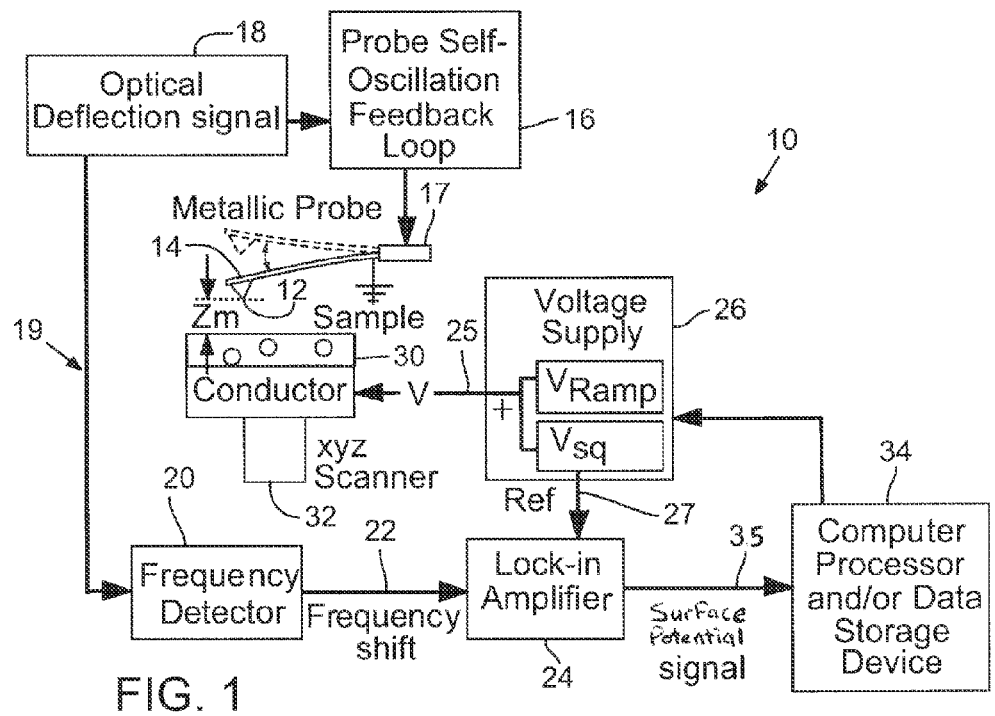
FIG. 1 is a simplified diagram of a single electron tunneling force spectroscopy (SETFS) system.

Electronic trap states in dielectric materials significantly influence the reliability and performance of electronic devices. Electron traps occur in many forms. In silicon dioxide for example, an exemplary electron trap may be formed where a silicon atom is bonded to only three oxygen atoms (i.e., one oxygen atom absent). The oxygen vacancy can capture an electron and cause a defect. Moreover, electron traps in gate oxides degrade device performance and reliability by shifting threshold voltage, increasing leakage current, and reducing mobility in the channel. (See Wilk, G. D.; Wallace, R. M.; Anthony, J. M. *J. Appl. Phys.* 2001, 89, 5243.) Many efforts to characterize electronic trap states in dielectric materials have been made. The approaches include electrical stress measurements (see Zhu, W. J.; Ma, T. P.; Zafar, S.; Tamagawa, T. *IEEE Elec. Dev. Lett* 2002, 23, 597; and Bersuker, G.; Sim, J. H.; Park, C. S.; Young, C. D.; Nadkarni, S. V.; Choi, R.; Lee, B. H. *IEEE Trans. on Dev. and Mat. Rel.* 2007, 7, 138), Kelvin probe force microscopy (see Ludeke, R.; Gusev, E. *J. App. Phys.* 2004, 96, 2365), conductive atomic force microscopy (see Kyuno, K.; Kita, K.; Toriumi, A. *App. Phys. Lett.* 2005, 86, 063510; and Krernnier, S.; Wurmbauer, H.; Teichert, C.; Tallarida, G.; Spiga, S.; Wiemer, C.; Fanciulli, M. *J. App. Phys.* 2005, 97, 074315), current-voltage spectroscopy (see Young, C. D.; Zhao, Y.; Heh, D.; Choi, R.; Lee, B. H.; Bersuker, G. *IEEE Trans. on Elec. Dev.* 2009, 56, 1322), spectrophotometry (see Hoppe, E. E.; Aita, C. R. *App. Phys. Lett.* 2008, 92, 141912), charge pumping (see Kerber, A.; Cartier, K A. *IEEE Trans. on Dev. and Mat. Rel.* 2009, 9, 147), spectroscopic ellipsometry (see Nguyen, N. V.; Davydov, Albert V.; and Chandler-Horowitz, D. *App. Phys. Lett.* 2005, 87, 192903; and Price, J.; Lysaght, P. S.; Song, S. C.; Li, H.; Diebold, A. C. *App. Phys. Lett.* 2007, 91, 061925), and photoionization (see Price, J.; An, Y. Q.; Lysaght, P. S.; Bersuker, G.; Downer, M. C. *App. Phys. Lett.* 2009, 95, 052906). While these measurements provide useful information about electronic trap states, these conventional measurement approaches cannot measure the three-dimensional distribution of the electronic trap states with atomic scale spatial resolution.

Therefore, a method to concurrently measure the depth and energy of individual trap states in a dielectric film is described herein. Such a method can be employed to characterize such trap states with an atomic scale of spatial resolution. In some embodiments, the method is based on a tunneling model using surface potential charge measurements performed at different selected voltages and different selected tip-sample gaps. When combined with two-dimensional trap state imaging, the method provides for three-dimensional imaging of electronic defect states in dielectrics with atomic scale spatial resolution, such as feature sizes down to less than 1 nm or down to less than 1 angstrom.

Single electron tunneling force measurements (see Klein, L. J.; Williams, C. C. *Appl. Phys. Lett.* 2002, 81, 4589; Bussmann E.; Kim D. J.; Williams, C. C. *Appl. Phys. Lett.* 2004, 85, 2538; and Bussmann, E.; Zheng, N.; Williams, C. C. *Nano Lett.* 2006, 6, 2577), single electron tunneling force spectroscopy (SETFS) (see Bussmann, E.; Williams, C. C. *Appl. Phys. Lett.* 2006, 88, 263108; and Zheng, N.; Johnson, J. P.; Williams C. C.; Wang, G. *Nanotechnology* 2010, 21, 295708), and dynamic tunneling force microscopy (DTFM) (see Johnson, J. P.; Zheng, N.; Williams, C. C. *Nanotechnology* 2009, 20, 055701) have been adapted to image the spatial distribution of individual electrons or hole trap states in nonconducting dielectric films and to measure their energy levels with respect to the valence and conduction bands. These methods are based on electrostatic force detection of single electron tunneling events between a metallic probe tip and individual trap states in completely nonconducting dielectric films. Atomic scale spatial resolution achieved in these measurements, as in scanning tunneling microscopy (STM), is due to the exponential dependence of the electron tunneling on tip-trap state separation. Most of the tunneling occurs from a subnanometer region at the apex of the metallic probe tip. In contrast, electrostatic force spectroscopy (EFS) (see Dana, A.; Yamamoto, Y. Nanotechnology 2005, 16, 5125; and Stomp, R.; Miyahara, Y.; Schaer, S.; Sun, Q.; Guo, H.; Gruner, P.; Studenikin, S.; Poole, P.; Sachrajda, A. Phys. Rev. Lett. 2005, 94, 056802), which also provides electrostatic force detection of single electron tunneling events, does not provide atomic scale spatial resolution, because the tunneling occurs between the substrate and states of interest. In these EFS measurements, the tip serves only as a force detector. Using the EFS approach, the energy spectrum of localized states in InAs quantum dots (see Dana, A.; Yamamoto, Y. Nanotechnology 2005, 16, 5125; and Stomp, R.; Miyahara, Y.; Schaer, S.; Sun, Q.; Guo, H.; Gruner, P.; Studenikin, S.; Poole, P.; Sachrajda, A. Phys. Rev. Lett. 2005, 94, 056802) and of quantum dots in carbon nanotubes (see Zhu, J.; Brink, M.; McEuen, P. L. Appl. Phys. Lett. 2005, 87, 242102) has been investigated.

When electrostatic force is used to detect electron tunneling to and/or from trap states in a dielectric film, the electric field in the vacuum gap and the dielectric film causes a depth dependent shift in the energy of the trap states relative to the tip Fermi level. (See Zheng, N.; Johnson, J. P.; Williams C. C.; Wang, G. Nanotechnology 2010, 21, 295708; and Dana, A.; Yamamoto, Y. Nanotechnology 2005, 16, 5125.) Additionally, the depth to which tunneling from the tip can occur in a given measurement time is dependent upon the trap state energy and the tip-sample gap distance.

Accordingly, the methodology is based upon a series of SETFS measurements performed at different tip-sample heights. These measurements are combined with a tunneling model that includes the dependence of the tunneling probability on trap state depth and energy.

FIG. 1 shows an exemplary SETFS system 10 including a metallic probe tip 12 positioned toward the end of a cantilevered probe 14. With reference to FIG. 1, a probe self-oscillation feedback loop 16 and a mechanical actuator 17, such as a piezoelectric actuator, can be employed to oscillate the probe tip 12 at a selected frequency in response to an AC voltage provided by the probe self-oscillation feedback loop 16. The probe self-oscillation feedback loop 16 may maintain oscillation of the probe tip 12 at the resonance frequency of the probe 14 and maintain the oscillation at a constant amplitude as is done in dynamic force microscopy. An exemplary resonance frequency of the probe 24 may be between 1 kHz and 1 MHz or between 100 kHz and 500 kHz, and an exemplary amplitude may be between 0.1 nm and 100 nm, between 10 nm and 30 nm, or between 0.1 nm and 10 nm.

In some modes, a frequency shift detection system 19, which includes an optical deflection signal 18 (such as a deflected laser beam) that cooperates with a frequency detector 20 (such as a photodiode detector), can be employed to determine frequency shifts in the oscillating probe tip 12. One or more components of the frequency shift detection system 19 may provide information to or cooperate with the probe self-oscillation feedback loop 16.

A frequency shift signal 22 from the frequency detector 20 can be fed to a lock-in amplifier 24 that also receives from a voltage supply 26 an AC reference voltage signal 27. The voltage supply 26 also provides voltage to a sample dielectric material 30 supported by an xyz positioner or scanner 32. The voltage supply 26 can provide an incrementally ramped voltage ($V_{Ramp}$) for successive tunneling measurement runs. The $V_{Ramp}$ voltage may be increased or decreased at a predetermined gradual slope or predetermined incremental step for each next set of tunneling measurements from a probe tip height at a selected location of the sample dielectric material 30. However, the $V_{Ramp}$ voltage could alternatively be switched between greatly different voltages and/or voltages at different polarities.

The voltage supply 26 can also provide a square wave voltage ($V_{sq}$) used to measure surface potential. Moreover, the AC reference voltage signal 27 provided to the lock-in amplifier 24 is typically at the frequency of a square wave applied between the probe tip 12 and the sample dielectric material 30. The square wave voltage is turned off for tunneling measurements. These voltages may be added together at the voltage supply and delivered by a common electrical line 25 as shown in FIG. 1. Similarly, the $V_{Ramp}$ and $V_{sq}$ voltages need not be supplied from a common voltage supply 26. Furthermore, a person having skill in the art with the aid of the present disclosure would recognize that the $V_{Ramp}$ and $V_{sq}$ voltages could alternatively be applied to the probe 14 instead of to the sample dielectric material 30. The voltage supply 26 may receive instructions from one or more computer processors and/or data storage devices 34. Moreover, some or all of the other components may be in communication with, be controlled by, or supply information to one or more computer processors and/or data storage devices 34. The operation of the SETFS system 10 is later described in greater detail.

Figure 2:
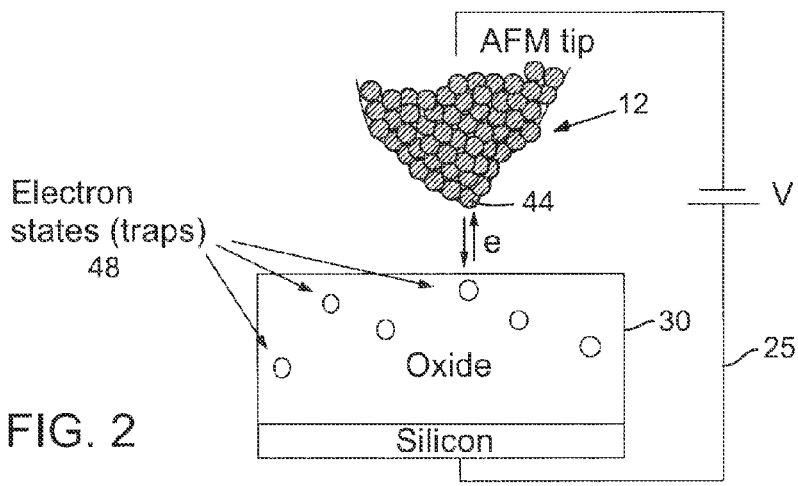
FIG. 2 is a simplified diagram showing an enlarged probe tip of the SETFS system shown in FIG. 1.

FIG. 2 shows an exemplary enlarged probe tip 12 of the SETFS system 10. The probe tip 12 may be made from a metallic material and may have a generally conical shape. In some embodiments, the probe tip 12 can have a shape that has hyperbolic curve or a reverse hyperbolic curve. In some exemplary embodiments, the probe tip 12 may terminate in a single exposed atom of a metal 44.

Typically, the deflection of the probe 14 is measured using a laser spot reflected from the top surface of the cantilever probe arm into an array of photodiodes, including but not limited to a one by one segmented array or a two by two array. Other methods that are used include optical interferometry, capacitive sensing or piezoresistive AFM cantilevers. These cantilever probes 14 may also be fabricated with piezoresistive elements that act as a strain gauge.

Figure 3:
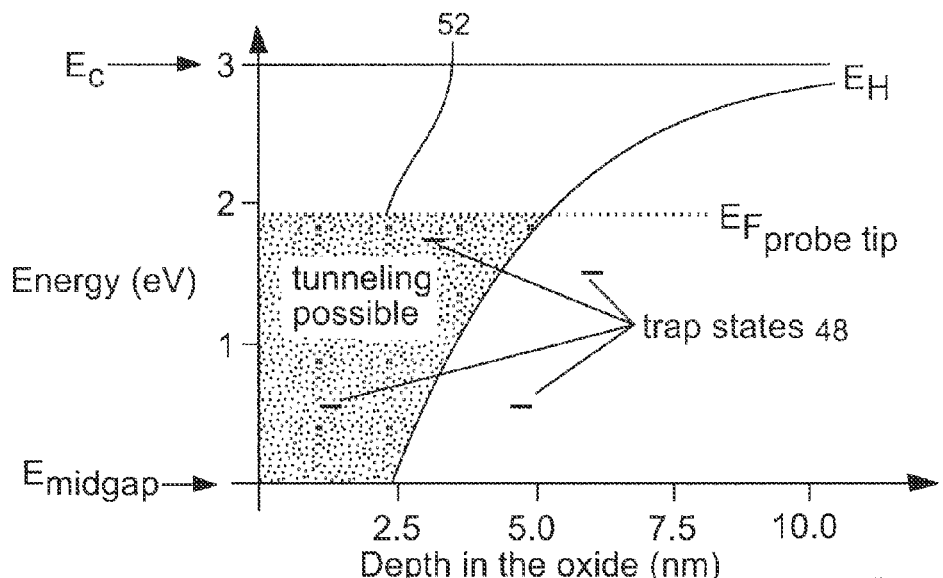
FIG. 3 is an energy-depth diagram illustrating probability and energy condition for tunneling.

Again with reference to FIGS. 1 and 2, for implementation, the probe tip 12 is positioned near a sample dielectric material 30. In some embodiments, the sample dielectric material 30 has a conductivity that supports only a current of less than 1 femtoamp (fa) (<$10^4$ electron/second). In some embodiments, the sample dielectric material 30 has a conductivity that supports only a current of less than 0.1 fa. In some embodiments, the sample dielectric material 30 has a conductivity that supports only a current of less than 0.01 fa. In some embodiments, the sample dielectric material 30 may have no conductivity at all. The sample dielectric material 30 may be a high-k dielectric material. The sample dielectric material 30 may alternatively be a low-k dielectric material. Exemplary sample dielectric materials 30 may be films of a silicon oxide, hafnium oxide, or other metallic oxide. Other suitable sample dielectric materials 30 include, but are not limited to, $HfSiO_x$, SiOF, SiOB, SiCOH, and diamond. A voltage is applied between the probe tip 12 and the sample dielectric material 30 to create an electrical field between them. The dependence of the tunneling on both the applied voltage and the gap between probe tip 12 and the sample dielectric material 30 forms the basis of independent depth and energy determination by the SETFS system 10, as illustrated in FIG. 3. Most of the tunneling occurs from a subnanometer region at the apex of the metallic tip 12, such as from a single metallic atom 44. A series of tunneling measurements is taken at different tip-sample heights for a range of applied voltages. Then, by differential subtraction of the raw tunneling data as a function of both the tip-sample gap and applied voltage, both the energy and depth of trap states in the sample dielectric material 30 can be determined.

In particular, SETFS makes use of quantum tunneling of electrons between the metal-coated probe tip 12 and electronic trap states in the sample dielectric material 30, such as completely nonconducting films. (See Bussmann, E.; Williams, C. C. *Appl. Phys. Lett.* 2006, 88, 263108; and Zheng, N.; Johnson, J. P.; Williams C. C.; Wang, G. *Nanotechnology* 2010, 21, 295708.) The tunneling of electrons depends on two conditions being satisfied. The first is an energy condition. For an electron to elastically tunnel, an empty trap state should be available in the dielectric below the Fermi level of the probe tip or a filled trap state should be above the Fermi level of the probe tip. The applied voltage shifts the Fermi level of the probe tip relative to the energy levels of trap states in the sample dielectric material 30. The shift of the Fermi level relative to a particular trap state depends upon many parameters, including but not limited to the tip-sample gap, the depth of the trap state in the sample dielectric material 30, and the thickness and dielectric constant of the sample dielectric material 30. The second condition that tunneling depends on is a tunneling probability condition. In other words, there should be sufficient overlap of the electronic wave functions of the probe tip 12 and the trap state for tunneling to occur. Moreover, the tunneling barrier (width and height) should be small enough for tunneling to occur in the measurement time. General calculations have been performed which predict the tunneling rate as a function of the tip-sample gap, the energy and depth of the trap state, and the electronic properties of the sample dielectric material 30. (See Zheng, N.; Johnson, J. P.; Williams C. C.; Wang, G. *Nanotechnology* 2010, 21, 295708.) With a typical vacuum-metal work function (such as on the order of 5 eV), the tunneling probability drops off by approximately an order of magnitude per 0.1 nm of vacuum gap. In the sample dielectric material 30, the drop-off of the tunneling probability with depth is typically less rapid than in vacuum, due to the smaller barrier height (the energy difference between the trap state and the conduction band). Thus, trap states nearer the conduction band can be accessed by tunneling at greater depths in the sample dielectric material 30.

There are additional considerations for separating the depth and energy of a given trap state by tunneling. One consideration is that the wave functions of states that are near the conduction or valence band drop off much more slowly with distance than do the wave functions of states that are near the center of the gap. Another consideration is that the application of a voltage between the probe tip 12 and the sample dielectric material 30 creates an electric field in the sample dielectric material 30, and this electric field shifts the energy of the trap states in the sample dielectric material 30 by an amount that depends upon their depth. So different trap states in the sample dielectric material 30 are shifted by different amounts depending upon their depth.

Because the energy condition and a finite tunneling rate need to be satisfied, a means to independently extract the state depth and energy from the measured data can be provided. One consideration in making the measurements is to choose the order in which the gap and applied voltage are changed.

A methodology for independent depth and energy determination of exemplary trap states 48 is illustrated in FIG. 3. FIG. 3 shows an energy-depth diagram of the position of four random trap states 48 (above mid-gap) in depth-energy space to illustrate the probability and energy condition for tunneling. The vertical axis represents the energy of the trap state 48 in the sample dielectric material 30. The energy range below mid-gap is not shown (mid-gap energy level=0), as the depth-energy analysis is similar whether the trap state 48 is above or below mid-gap.

When a probe tip 12 is placed directly over a particular trap state 48 in a sample dielectric material 30, with a tip-sample gap z and a voltage V applied between the probe tip 12 and the sample dielectric material 30, there is a curve 50 on the energy-depth graph of FIG. 3 that defines the depth to which tunneling can occur in a given measurement time. The shape of the curve 50 arises from the smaller effective barrier height for trap states 48 nearer the conduction band in the sample dielectric material 30. The curve 50 represents a contour of constant tunneling rate (for example, 1 electron/second). This calculation is based upon the tip state wave function decay through two barriers: the vacuum barrier and the barrier in the sample dielectric material 30. For the vacuum barrier, the wave function decays as $$e^{-z\sqrt{\frac{2m_e(E_{vac}-E_s)}{\hbar^2}}}$$

where $m_e$ is the mass of the electron, z is the tip-sample gap, and $E_{vac}-E_s$ is the barrier height—the difference in energy between the vacuum level and the energy of the trap state 48 in question. In the sample dielectric material 30, the wave function decays as $$e^{-d\sqrt{\frac{2m_e^*(E_c-E_s)}{\hbar^2}}}$$

where $m_e^*$ is the effective mass of the electron in the oxide, d is the depth in the sample dielectric material 30, and the barrier height is determined by the difference between trap state energy and conduction band energy ($E_c-E_s$). The shaded area in FIG. 3 corresponds to the region of depth-energy space for which both the energy and tunneling probability conditions are met.

To the left of the tunneling probability curve 50, drawn for a given tip-sample gap z, the tunneling probability is greater than the minimum tunneling rate. (As noted earlier, an exemplary tunneling rate is greater than or equal to 1 electron/second; however, alternative tunneling rates are typical. For convenience, the tunneling rate can also be deemed as greater than or equal to 0.1 electron/second, 0.5 electron/second, or 2 electrons/second. Similarly, although the tunneling probability is greater than the tunneling rate, the tunneling probability can be established to be 1.1 times, 1.5 times, or 2 times the tunneling rate, or greater, or other factors of the tunneling rate.) Beneath the dotted line 52 (representing the Fermi level of the probe tip 12), the tunneling energy condition is satisfied for electron injection. Thus, as previously noted, the shaded area shows where both the tunneling condition and the energy condition are satisfied. More positive applied voltage to the sample dielectric material 30 moves the probe tip Fermi energy (dotted line) upward relative to the trap states, accessing a greater area in energy-depth space. Decreasing the gap (z) allows for tunneling deeper into the sample dielectric material 30.

Figure 4A:
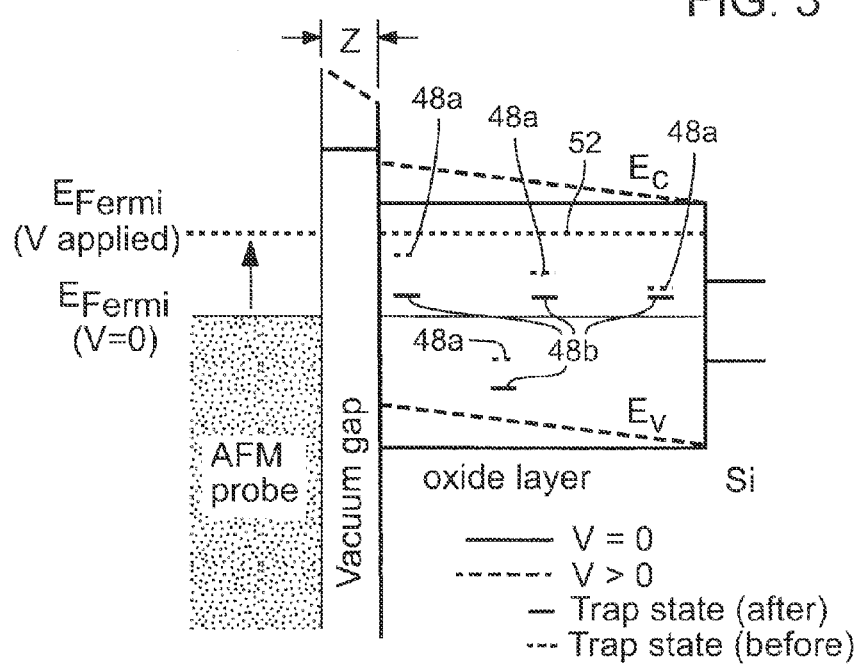

Corrections can be made to the graph in FIG. 3 to account for the electric field in the gap and the sample dielectric material 30 when a voltage is applied. FIGS. 4A-4F illustrate the influence of applied voltages on tunneling conditions and a method for correcting for the applied voltages. In particular, FIG. 4A presents an energy-depth diagram showing the measured energy-depth of the trap states 48a after (dotted) the application of a voltage and the energy-depth of trap states 48b before (solid) the application of a voltage. The applied voltage modifies the vacuum barrier and bends the conduction bands in the sample dielectric material 30, shifting the energy of the trap states 48 relative to the Fermi level of the probe tip 12 by an amount which depends upon their physical depth in the sample dielectric material 30, as shown in FIG. 4A. With reference to the energy-depth diagram FIG. 4B, the region in energy-depth space becomes trapezoidal when a voltage is applied, due to the band bending in the sample dielectric material 30. The region in depth-energy space above the mid-gap energy level in the sample dielectric material 30 is emphasized for convenience. Since the energy difference between the trap states 48 and the conduction band does not change with the applied voltage, the trapezoid can be remapped into a rectangle, which is independent of the applied field. This remapping is shown in the energy-depth diagram of FIG. 4C. When plotted in this way, the line representing the position of the Fermi level (dotted line) 52 of the probe tip 12 relative to the trap states 48 is no longer horizontal. Also note that the applied field causes a greater shift of the probe Fermi level 52 with respect to deeper states 48 than to states 48 nearer the surface of the sample dielectric material 30. The energy-depth diagram of FIG. 4D combines the adjustments of the energy-depth diagram of FIG. 4C with several tunneling probability curves for three different tip-sample gaps (z). The quantitative calculation of both the tunneling probability and the position of the tip Fermi level 52 relative to states 48 in the sample dielectric material 30 with an applied bias voltage can be implemented in a program written in Maple, for example.

Figure 4E:
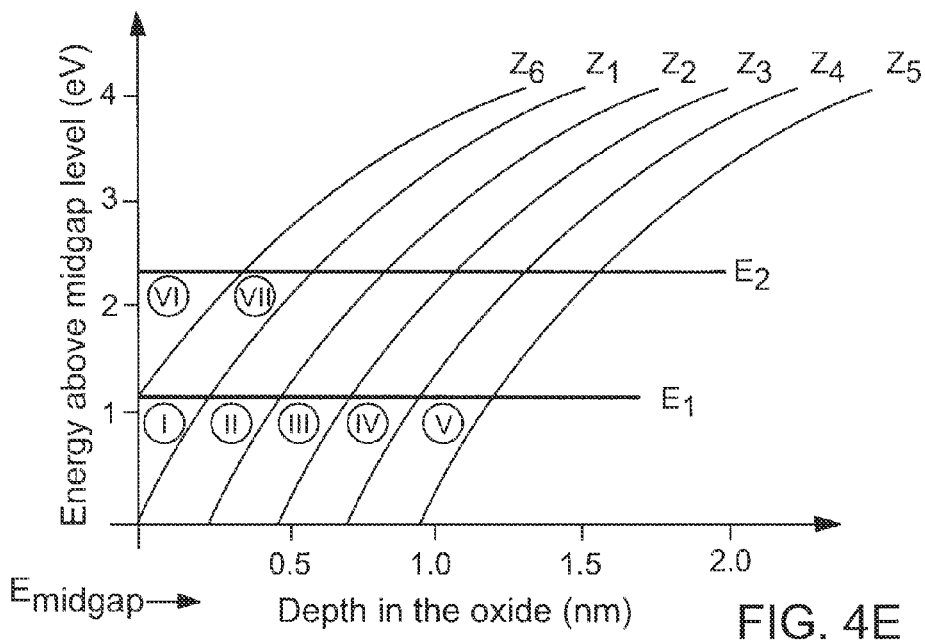

FIG. 4E is an energy-depth diagram that demonstrates how specific regions of the energy-depth space, and particularly energy-depth planes, can be probed. The Fermi level is brought to the line labeled $E_1$ and the number of electrons that tunnel in region (I) of FIG. 4E is measured. Then, while keeping the Fermi level at $E_1$, the probe tip 12 is moved from gap $z_1$ to gap $z_2$, and in this way the number of tunneling electrons in region (II) can be found by subtracting the number of tunneling electrons from region (I) from the total measured in regions I and II. These steps can be repeated by moving the probe tip 12 to gaps $z_3$, $z_4$, and $z_5$ to find the signal in regions (III), (IV), and (V), respectively. Shifting the tip Fermi level to $E_2$ and moving to gap $z_6$ gives the signal in region (VI), and moving the tip back to $z_1$ at $E_2$ gives the total signal from tunneling to regions (I), (VI), and (VII). In some embodiments, the surface potential measurements indicative of tunneling may be taken in order from the largest gap to the smallest gap. So, in this example, $z_6$ represents the largest gap and $z_5$ represents the smallest gap, i.e. $z_6 > z_1 > z_2 > z_3 > z_4 > z_5$. However, the measurements can be taken in a different order, and the calculation for the differential charge for a particular region in the energy-depth diagram can be modified to accommodate the specific factors associated with the selected order of measurements.

Accordingly, incrementally changing the applied voltage and the tip-sample gap allows for a map of the density of trap states available for tunneling in both energy and depth in the sample dielectric material 30. Thus, FIG. 4E presents the contours of the depth of possible tunneling for certain values of the tip-sample gap, z, and for certain locations of the tip Fermi energy, E, relative to the trap states in the sample dielectric material 30. For a given E and z, tunneling is possible to the left of the z curve and below the level E.

Figure 4F:
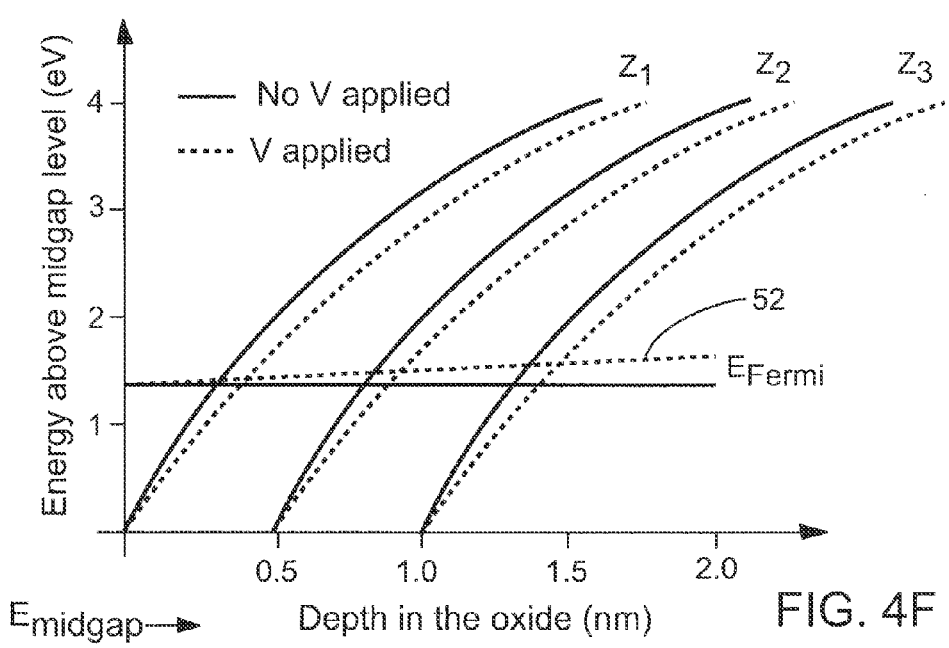

FIG. 4F is an energy-depth diagram illustrating exemplary slight corrections made to FIG. 4E when a voltage is applied between the probe tip 12 and the sample dielectric material 30. The barrier modification allows tunneling to greater depths than would be possible without the correction to the barrier height. Moreover, the bending of the bands allows tunneling to energies further above the mid-gap level than would be possible without bending.

Some confirmatory experiments were performed in UHV (~$10^{-9}$ Torr) using an Omicron Multiprobe-S atomic force microscope (AFM)/STM such as equipment used by Bussmann, E.; Zheng, N.; Williams, C. C. Nano Lett. 2006, 6, 2577; and Zheng, N.; Johnson, J. P.; Williams C. C.; Wang, G. Nanotechnology 2010, 21, 295708 and similar to the simplified SETFS system 10 shown in FIG. 1. Although the SETFS system 10 shown in FIG. 1 can be used to perform energy-depth measurements, the Omicron Multiprobe-S atomic force microscope (AFM)/STM was modified to include a height control feedback loop 60 as shown in the SETFS system 62 of FIG. 5. With reference again to FIG. 5, the SETFS system 62 includes many components analogous to those shown in the SETFS system 10 of FIG. 1, so such components are provided with corresponding reference numerals for convenience. The height control feedback loop 60 includes a height control feedback loop controller 64 that receives a set point frequency instruction signal 66, such as selected directly from a user, or indirectly through a computer such as the computer processor and/or storage device 34. The height control feedback loop controller 64 also receives a frequency shift information signal 68 directly or indirectly from the frequency detector 20. The frequency shift information signal 68 may be the same as the frequency shift signal 22. The height feedback loop controller 64 provides a height compensation signal 69 to the xyz scanner 32 to adjust the elevation of the surface of the sample dielectric material 30 with respect to the frequency set point to establish a known height of the probe tip 12 with respect to the surface of the sample dielectric material 30.

One simple approach to height control is to allow the probe tip 12 to touch the surface of the sample dielectric material 30 before tunneling is attempted at each location. The contact of the probe tip 12 permits a direct and immediate indication of the exact spatial elevation of the surface at the location selected for tunneling examination. The probe tip 12 can then be elevated to the exact height and subsequent heights selected for the initiation of all of the height and voltage runs. The height control feedback loop 60 can be activated before or during relative movement of the probe tip 12 to the sample dielectric material 30 to position the probe tip 12 at the selected location on the surface of the dielectric material 30, or the height control feedback loop 60 can be activated after the probe tip 12 reaches the selected location.

In some embodiments, the height control feedback loop 60 can be engaged only a single time at each selected location on the surface of the dielectric material 30. However, the height control feedback loop 60 can be engaged before voltage step runs are conducted at each selected height above each location. In some embodiments, voltage step runs can be conducted at several heights at a selected location on the surface of the dielectric material 30 before the height control feedback loop 60 is re-engaged. The number of heights before re-engagement may be fewer than 30 or fewer than 15 or greater than five or greater than 10.

However, the number of voltage steps conducted and the height drift factors may warrant the use of the feedback loop 60 at multiple times during the voltage step runs for any given height. For example, the probe tip 12 may be induced to contact the sample dielectric material 30 after every five incremental voltages at a given height or before every other incremental voltage applied at a given height. In some embodiments, the probe tip 12 may be induced to contact the sample dielectric material 30 for engagement of the height control feedback loop 60 before every new voltage is applied. In general, the height control feedback loop 60 can be engaged at any point between the voltage step runs to maximize the number of voltage measurements taken within a selected time period based on the projected maximum permissible drift. For example, an exemplary voltage run at selected height may take less than about 6 seconds, so 10 exemplary height-voltage step runs can be evaluated in less than 1 minute. If the projected maximum permissible drift is about 0.1 nm per minute, then desirable height control engagement would be greater than about once for every 10 height-voltage step runs (and the height control engagement would not necessarily take place at the start of a new height-voltage step run). If the projected maximum permissible drift were smaller, such as 0.01 nm per minute, and the height-voltage step runs took about the same amount of time, then the height control feedback loop 60 would be engaged for each height-voltage step run. Moreover, doubling the number of voltage measurements in each height-voltage step run would entail two engagements of the height control feedback loop 60 to maintain the 0.01 nm per minute projected maximum permissible drift.

The probe tip 12 need not be in actual physical contact with the surface of the sample dielectric material 30 to implement the height control feedback. Because the frequency shift of the probe 14 begins to change as the probe tip 12 descends toward or ascends away from the surface of the sample dielectric material 30, a frequency shift set point can be selected. The frequency shift of the probe 14 decreases during descent toward the surface of the sample dielectric material 30, so in this "attractive mode," a set point can be employed for reference of the probe tip 12 to the elevation of the surface of the sample dielectric material 30. The frequency shift of the probe 14 increases during ascent away from the surface of the sample dielectric material 30, so in this "repulsive mode," a set point can be employed for reference of the probe tip 12 to the elevation of the surface of the sample dielectric material 30. The repulsive mode can also be referred to as "contact mode" because the selected set point occurs after the probe tip 12 would "touch" the surface of the sample dielectric material 30. The attractive mode can also be referred to as "noncontact mode" because the selected set point occurs before the probe tip 12 would "touch" the surface of the sample dielectric material 30.

Although a positive or negative set point for feedback control of less than or equal to about 10 Hz is generally desired, other set points may be employed. For example, a positive or negative set point of between 1 Hz and 10 Hz may be employed. However, the positive or negative set point can be less than or equal to 5 Hz, 2 Hz, or 1 Hz. Alternatively, the positive or negative set point can be less than or equal to 10 Hz and greater than or equal to 5 Hz, 2 Hz, or 1 Hz. For some applications, a much larger value for the set point may be desirable, such as from about 10 Hz up to about 100 Hz. With a suitably chosen frequency shift set point on the falling or rising slope and a slow height control feedback loop 60, a simultaneous height feedback signal and SETFS signal is possible.

The height control feedback loop 60 may also offer a tradeoff between tunneling height accuracy and scan speed. Specifically, increasing the speed of the height control feedback loop 60 allows for quicker determination of height of the sample dielectric material 30 and, hence, less time taken per measurement, voltage run, height run, or location. However, increasing the speed of the height control feedback loop 60 results in more relative uncertainty in height (potentially due to increased noise). The height to which the probe tip 12 is raised is based on the instantaneous value of the height the moment the feedback loop 60 is disabled.

Another tradeoff offered by height control feedback loop 60 is that on applying the SETFS waveforms after lifting the tip, the SETFS signal may take time to settle down, due to transients that may occur. The time scale for this settling may be equivalent to several time constants of the lock-in amplifier 24 (typically 10-100 ms). Although the settling time, along with the low loop speeds, makes SETFS measurements with height control slower than SETFS measurements with the height control feedback loop 60 disabled, the enhanced accuracy of the SETFS measurements separated by periodic use of the height control feedback loop 60 is worth the additional time for most SETFS applications. The height of the probe tip 12 to the surface of the sample dielectric material 30 can be controlled to within 0.1 nm, 0.05 nm, or 0.01 nm of the true height, or better.

With reference again to confirmatory experiments, the sample dielectric material 30 was a 10 nm $HfO_2$ film grown on a 1.5 nm-thick interfacial $SiO_2$ layer on Si, which was annealed in a rapid thermal annealing process at 1000° C. for 5 seconds. After annealing, the sample dielectric material 30 was cleaned in an ultrasonic bath in acetone and then in an ultrasonic bath in isopropanol (IPA), after which it was rinsed in de-ionized $H_2O$ and blown dry with $N_2$. After insertion in the vacuum chamber, the sample dielectric material 30 was heated to 500° C. for 30 minutes to remove organic contamination before imaging and measurement. Other surface preparation techniques would be known to skilled practitioners with the aid of the present disclosure.

With reference again to FIG. 5, the following method was employed to measure tunneling charge injected and/or extracted during the spectroscopic measurements of the aforementioned sample and can be employed generally for other sample dielectric materials 30. An oscillating (45 nm amplitude, 300 kHz frequency) AFM probe tip 12 with a metallic tip coating (10 nm Pt on a 20 nm Ti sublayer) was placed at a selected location on the surface of the sample dielectric material 30 using the height control feedback loop 60 with a positive set point of 5 Hz (repulsive mode). Relative movement between the probe tip 12 and the surface of the sample dielectric material 30 can be accomplished by movement of the probe tip 12 (such as by piezoelectric actuator(s)), movement of the sample dielectric material 30 (such as by movement of the scanner 32), or by movement of both the probe tip 12 and the sample dielectric material 30. The movement of the probe tip 12 and the sample dielectric material 30 can be simultaneous and controlled as integrated movements or can be discrete movements of the probe tip 12 and the sample dielectric material 30, or the movements of the probe tip 12 and the sample dielectric material 30 can be performed at separate times. Moreover, in some embodiments, one of the probe tip 12 and the xyz positioner 32 can make the z movements while the other of the probe tip 12 and the xyz positioner 32 can make the x and y movements.

Although an oscillating amplitude of less than or equal to 100 nm may be desired, other oscillating amplitudes may be employed. For example, the oscillating amplitude can be less than or equal to 75 nm, 50 nm, 25 nm, or 10 nm and may be chosen based on a number of factors, including but not limited to, the frequency. The frequency employed can be less than or equal to 500 kHz, 300 kHz, or 250 kHz.

With reference again to the $HfO_2$ test example, after the height control feedback loop 60 established the height of the probe tip 12 at the positive set point with respect to the surface of the sample dielectric material 30 at the selected location, the height control feedback loop 60 was inactivated. Then the probe tip 12 was retracted to a height outside of tunneling range (e.g. >about 5 nm). At this height, the local surface potential was measured (see Bussmann, E.; Zheng, N.; Williams, C. C. Nano Lett. 2006, 6, 2577) by applying a square wave (+3/−3V) between the probe tip 12 and the sample dielectric material 30 at 318 Hz, while monitoring how the cantilever resonance frequency changed (using the frequency shift detection loop) at the applied frequency of the square wave. The square wave voltage was then turned off, the probe tip 12 was brought to the desired tunneling gap (e.g. initially about 0.4 nm), and a stepped voltage ramp was initiated. With the first DC voltage step of the ramp applied, trap states that were empty and below the Fermi level of the probe tip 12 were filled by injection from the probe tip 12. The probe tip 12 was then brought back to a height outside of tunneling range (such as the same height as before), and the surface potential was measured again. The value of the surface potential change (before and after the tunneling attempt) was proportional to the amount of charge injected during that voltage ramp step, i.e. charge transfer was inferred by the measured change in surface potential. After the surface potential change was measured, the height control feedback loop 60 was implemented to place the probe tip 12 on the surface of the sample dielectric material 30 with respect to the positive set point, before the next data point was taken at the next voltage in the voltage ramp. This process eliminated the effects of vertical drift between the probe tip 12 and the sample dielectric material 30.

Thus, between each step in the applied voltage ramp, the height control feedback loop 60 was enabled to relocate the surface of the sample dielectric material 30, eliminating the effects of vertical drift between the probe tip 12 and the sample dielectric material 30. To gather both the energy and depth data concerning the trap states, one can repeat this entire process for a range of values of the tip-sample gap at each selected location.

The variables of the voltage and frequency of the square wave can be adjusted to suit particular sample dielectric materials 30, particular probe tip types and variations, and particular aspects or idiosyncrasies of the SETFS systems 10 or 62. Similarly, the height of the probe tip 12 beyond the tunneling range, the initial gap height for measurement, and the value for the incremental gap height increases can all be selected based on particular applications. Also, the start and end points of the ramp of the applied voltage steps as well as the incremental voltage change value (or more generally the differences in neighboring voltages regardless of whether they are measured sequentially) may be selected based on particular applications.

For example, the square wave voltage may be between +10 V and −10 V, +5 V and −5 V, +3 V and −3 V, or +2 V and −2 V, and the square wave frequency may be less than 5 kHz, 1 kHz, or 500 Hz and/or greater than 50 Hz, 100 Hz, or 300 Hz.

The height of the probe beyond the tunneling range may be greater than or equal to 4 nm, 5 nm, 6 nm, or 7 nm and/or less than 12 nm, 10 nm, or 8 nm. The smallest tip-sample gap employed for tunneling may be greater than or equal to 0.1 nm or 0.2 nm and/or less than 1 nm, 0.8 nm, 0.6 nm, or 0.5 nm. The largest tip-sample gap employed for tunneling may be less than or equal to 4 nm, 3 nm, or 2 nm. The gap step values employed for tunneling may be increments of less than or equal to 1 nm, 0.5 nm, 0.4 nm, 0.3 nm, 0.2 nm, or 0.1 nm and/or greater than 0.01 nm, 0.005 nm, or 0.1 nm. These increments need not be equal; however, all of the applied voltage values should be made at each height measured. Moreover, the gap selections may initiate with the closest gap and increase to a gap that is out of tunneling range; however, there may be some advantages to initiating the gap selections to initiate at a height that is out of (or just within) tunneling range and decreasing to a minimum gap selection. The start and end points of the ramp of the applied voltage steps may be between +10 V and −10 V, +6V and −6 V, +5V and −5 V, +3V and −3 V, +2V and −2 V, or +1 V and −1 V. These start and end points need not have the same absolute value; for example, the start and end points could be +5V and −3V. The incremental voltage change value may be less than or equal to 2V, 1V, 0.5V, 0.2 V, or 0.1 V and/or greater than 0.01 V or 0.05 V. The voltage increments need not be equal; however, the same regimen of voltage steps can be used for measurement at each gap height. Furthermore, the voltage steps need not be neighboring voltage values. For example, measurements at 1 V and at 3 V may be obtained before a measurement at 2 V is obtained. Moreover, it may be desirable to obtain sequential measurements of voltages of opposite polarity (see FIG. 10), such as at 1V and at −1 V, but the sequentially applied voltages of opposite polarity need not be the same or even neighboring test voltages. Any combination of these variables can be employed as warranted by the specific SETFS systems 10 and applications, the sample dielectric materials 30, and the resolution of information sought.

For example, in some embodiments, the applied voltage is ramped from −5V to 5V in 1V steps, and tunneling charge is measured from one to four times for each voltage step. The tip-sample gap height is then slightly increased (such as by 0.2 nm), and another tunneling charge versus applied voltage curve is acquired.

The probe height is increased in steps after each set of tunneling measurements is performed at the different applied voltages. The height may be increased until the probe tip 12 is completely out of tunneling range, or the height may be increased until a preselected height is reached. The recorded tunneling charge data versus tip height and applied voltage is then put into a two-dimensional array, which is then processed to determine the differential tunneling charge associated with each of the individual regions of depth-energy space.

As described with respect to FIG. 3, at a given applied injection voltage and tip-sample gap, the injected charge tunnels to all available empty trap states (shaded region) in the sample dielectric material 30 that are below the apparent Fermi level (dotted line) of the probe tip 12 and within tunneling range (to the left of the tunneling probability curve $E_H$). When the probe voltage is increased or the gap decreased, additional trap states in the sample dielectric material 30 may become accessible to tunneling. To obtain the differential charge injected exclusively into newly accessible trap states, the charge injected at the previous voltages and heights may be subtracted. The same is done for previous probe tip heights and voltages. This process is generally described with respect to FIG. 4E.

FIG. 6A is an energy-depth diagram that graphically illustrates this process using modeled tunneling curves for two consecutive applied voltages at two probe tip heights, and FIG. 6B provides an exemplary equation and pictorial representation of a depth-energy algorithm modeling this process for the two consecutive applied voltages at two probe tip heights. With reference to FIG. 6A, the curved (z) lines represent the depth of possible tunneling for certain values of the tip-sample gap z and the tip Fermi-level positions as a function of state depth for certain applied voltages $V_{app}$ (straight sloped lines).

For a given $V_{app}$ and z, tunneling is possible to the left of the z curves and below the Fermi-level curve at the applied voltages $V_{APP}$. In other words, the injected charge value is proportional to the difference of surface potential measurements made before and after tunneling attempts at a selected height and voltage. This selected injected charge value for the selected height and voltage is cumulative of the injected charge values for the surface potential measurements made at heights and voltages that are to the left of the z curve and below the Fermi-level curve for the selected height z and applied voltage $V_{APP}$. Thus, to determine the differential charge injected into the selected depth-energy region "a" at the selected location, the charge injection signal measured under the four conditions (two voltages, two heights) is subtracted or added according to the differential charge expression: $dQ=Q_{z,V}-Q_{z+1,V}-Q_{z,V-1}+Q_{z+1,V-1}$, where $Q_{z,V}$ is the surface potential difference (before and after tunneling) at a height z and voltage V. This expression is shown in both algebraic and graphical form in FIG. 6B for specific values for applied voltages and probe tip heights. It will be appreciated that the surface potential measurements indicative of tunneling with respect to this example were taken in order from the largest gap to the smallest gap to satisfy the differential charge expression. However, the measurements could be taken in a different order, and the calculation for the differential charge for a particular region in the energy-depth diagram could be modified to accommodate the specific factors associated with a different selected order of measurements. It will also be appreciated that the terms in the mathematical equation for differential charge expression are not presented in an order that correlates with the order in which the measurements were taken. However, the terms in the mathematical expression could be presented in an order that better correlates with the order in which the measurements were taken.

With reference to FIGS. 6A and 6B, the differential injected charge (region "a" in FIG. 6A) is obtained by taking the total injected charge at 3 V and 1.6 nm (region "a"+region "b"+region "c"+region "d"), and subtracting the total injected charge at 2 V and 1.6 nm (region "b"+region "d"), subtracting the charge at 3 V and 1.8 nm (region "c"+region "d"), and adding back in the amount of injected charge at 3 V and 1.6 nm (region "d") since the charge in this area was subtracted twice. This differential process is applied sequentially to the entire two-dimensional array of measured data until the differential charge in each region of energy-depth space is determined. This differential charge is proportional to the density of trap states in each respective region of energy-depth space. The differencing can be performed by a program written in Sigmaplot, for example.

Figure 7:
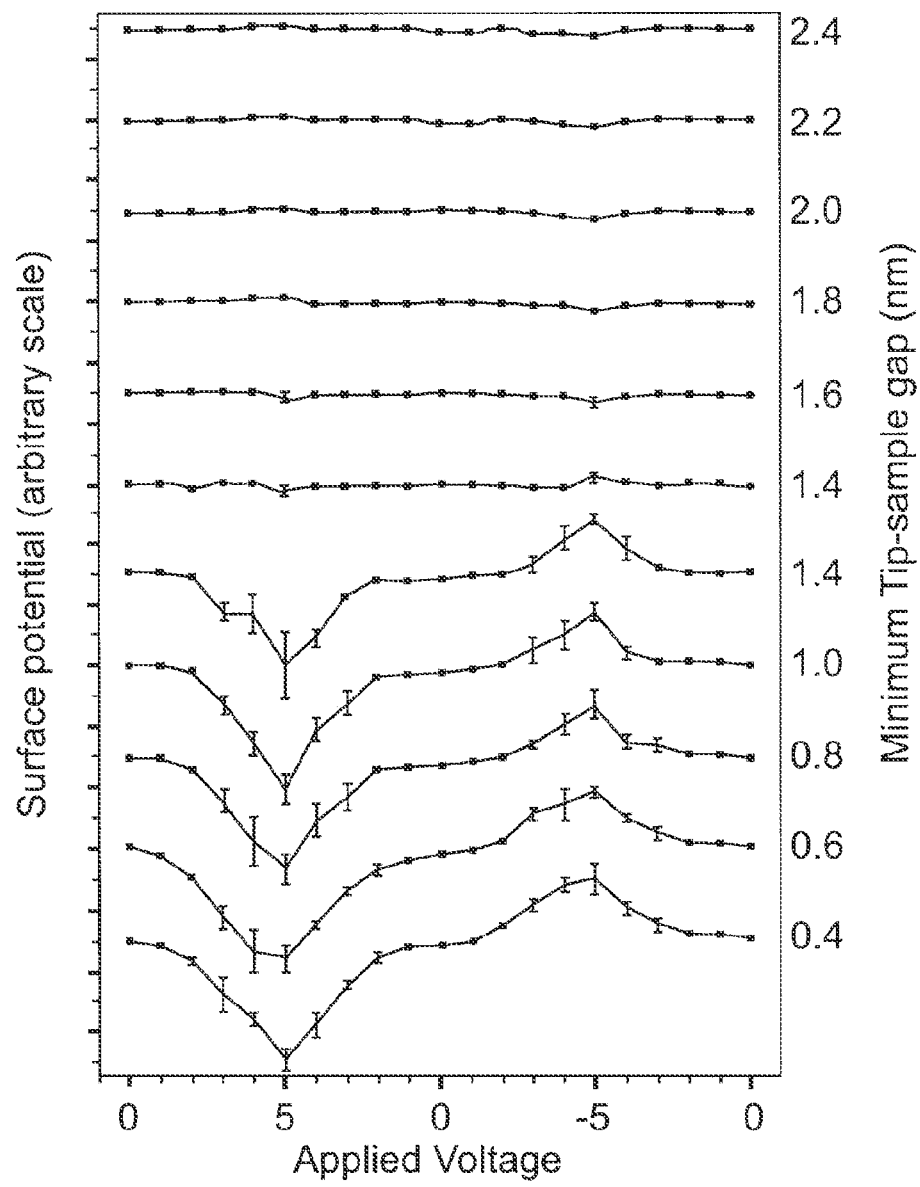
FIG. 7 is a graph showing measured data of the surface potential, the applied voltage, and the tip-sample gap height.

Actual experimental data from multiple SETFS scans taken at a particular region or location on a sample high-k dielectric material 30 ($HfO_2$ film) are shown in the diagram of FIG. 7 that illustrates exemplary relationships of the surface potential, the applied voltage, and the tip-sample gap. The surface potential signal (the difference between surface potential before and after a tunneling attempt at a particular ramp voltage step) is proportional to the amount of charge which tunnels during the tunneling attempt at the given applied voltage. The surface potential signal increases as more depth-energy space is made accessible either by increasing the magnitude of the applied voltage or by decreasing the minimum tip-sample gap. Each data point on the graph represents the average of four tunneling attempts at each applied voltage and tip-sample gap, and the standard deviation of those four measurements is shown by the error bars. The scans have been offset for clarity, but each begins and ends near 0 V surface potential. At large tip-sample gaps, no tunneling is observed, which is consistent with the small tunneling probability (wave function overlap) expected at those distances. The first consistent tunneling events are observed at a minimum tip-sample gap of 1.4 nm, consistent with previous calculations of the tunneling rate (see Zheng, N.; Williams, C. C.; Mishchenko, E. G.; Bussmann, E. *J. Appl. Phys.* 2007, 101, 093702) for the approximate time (e.g. 2 milliseconds) the oscillating probe tip 12 spends within tunneling range per measured point. In this embodiment, the tip-sample gap may be defined as the minimum height of the probe tip 12 with respect to the surface of the sample dielectric material 30 at the lowest point in the oscillation of the probe tip 12 (i.e., "minimum tip-sample gap"). Although the selected or reference probe tip gap height is often correlated with the "minimum tip-sample gap" during an oscillation, the selected or reference probe tip gap height can, for example, instead be correlated with the maximum tip-sample gap or neutral tip-sample gap with respect to the amplitude of an oscillation.

Figure 8:
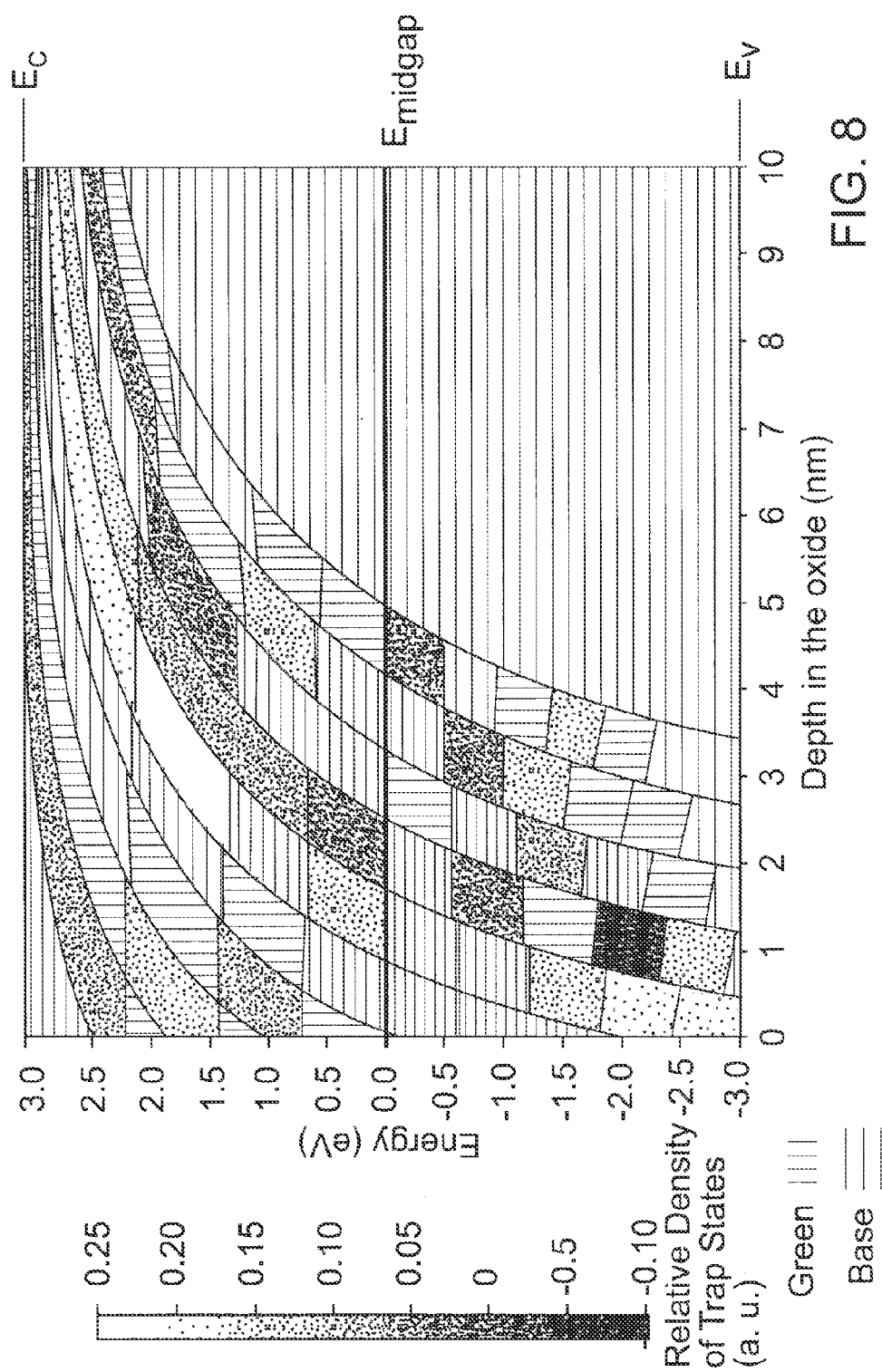
FIG. 8 is a diagram showing trap state density as a function of energy versus depth as determined by the data gathered in FIG. 7.

The two-dimensional array of differential charge data can be input into a software program such as a Maple program to define the regions of depth-energy space associated with each applied voltage/tip-sample height and to assign the values of differential charge to the appropriate regions or locations. FIG. 8 shows energy-depth results associated with the differential charge that tunnels to each region (the relative density of trap states) of the depth-energy space. The data shown in FIG. 7 and the algorithm in FIG. 6B are used to obtain the results shown in FIG. 8, while the tunneling rate curves bounding the regions are calculated using a two-barrier method described above (see Zheng, N.; Williams, C. C.; Mishchenko, E. G.; Bussmann, E. *J. Appl. Phys.* 2007, 101, 093702), with a simplifying assumption of a square vacuum tunneling barrier. The entire depth-energy space inside the $HfO_2$ sample dielectric material 30 is shown in FIG. 8, in contradistinction to only the region above mid-gap shown in some of the previous figures. The SETFS measurements performed on the $HfO_2$ sample did not show discrete single electron tunneling events. The trap density for this example is apparently high enough that trap states are electronically coupled together. The data are therefore plotted with an arbitrary scale (vertical axis), showing only the relative density of trap states. Several regions stand out as having larger values for the differential charge, all shown as least densely shaded regions in FIG. 8. It will be appreciated that only positive voltages were applied in the example in FIGS. 6A and 6B and that if negative voltages had been used, FIG. 8 would have a different look.

In particular, the processed data show multiple dominant states or groups of states, one at a depth of 4 to 6 nanometers at an energy between 1.5 and 2.3 eV above mid-gap. A second state or group of states appears at a depth of between 6 and 10 nm, with an energy between 2.3 eV and 2.7 eV. Another appears at a depth of 6 to 10 nm and an energy between 2.3 eV and 2.7 eV. The other variations seen in FIG. 7 are likely caused by noise in the measured data. The data noise is also the reason that some regions in the plot have a slightly negative value. Note that the depth resolution near the center of the gap in these measurements is ~0.8 nm. The number of height and voltage steps taken during the measurement determines the resolution in both depth and energy. While the number of steps can be arbitrarily increased, the signal to noise ratio in the differenced data becomes smaller as the step size becomes smaller. As noise sources are reduced, better resolution in the depth dimension can be achieved. Moreover, further refinements in both experimental method and modeling can be achieved.

A small lateral drift of the probe tip 12 relative to the sample dielectric material 30 may occur during these measurements (estimated to be ~3 Å/min). Therefore, small changes in the exact location of the tunneling are expected to occur during the spectroscopic data acquisition (spectra take about 1.5 min/scan). The time for spectroscopic data acquisition may be dependent on the selection of the scan variables including, but not limited to, the number of tunneling attempts made at each applied voltage at the given height of the probe tip 12 and the number of voltage steps. It was observed, however, that spectra acquired sequentially (at different locations) on the exemplary sample dielectric material 30 did not change significantly, indicating that the effective tunneling radius of the probe tip 12 is larger than the lateral drift during acquisition of the energy spectra or that the density of trap states is relatively uniform over small areas. The drift rate can be reduced by performing the methodology at lower temperatures, performing faster spectroscopic scans, and/or using a method to actively cancel drift. For example, at a temperature of less than or equal to four degrees Kelvin, the drift rate is typically one to two orders of magnitude lower than at room temperature. Alternatively or additionally, with the improved signal to noise ratio of the AFM-based SETFS system 10, tunneling spectra could be taken at faster speeds with larger bandwidths (such as less than or equal to 6 seconds per scan). The signal to noise ratio is, of course, dependent on the quality and nature of the AFM-based system used. Alternatively or additionally, the rate of drift can be measured and the probe tip 12 can be moved at the same speed, or one or more features can be tracked and the position of the probe tip 12 can be adjusted with respect to one or more feature positions.

It will be appreciated that the height control feedback loop 60 can be combined with lateral drift compensation techniques as would be known to skilled practitioners with the aid of the present disclosure. However, other independent techniques for addressing x or y drift could be implemented independently for SETFS energy depth methodology as would also be known to such skilled practitioners with the aid of the present disclosure.

Figure 9:
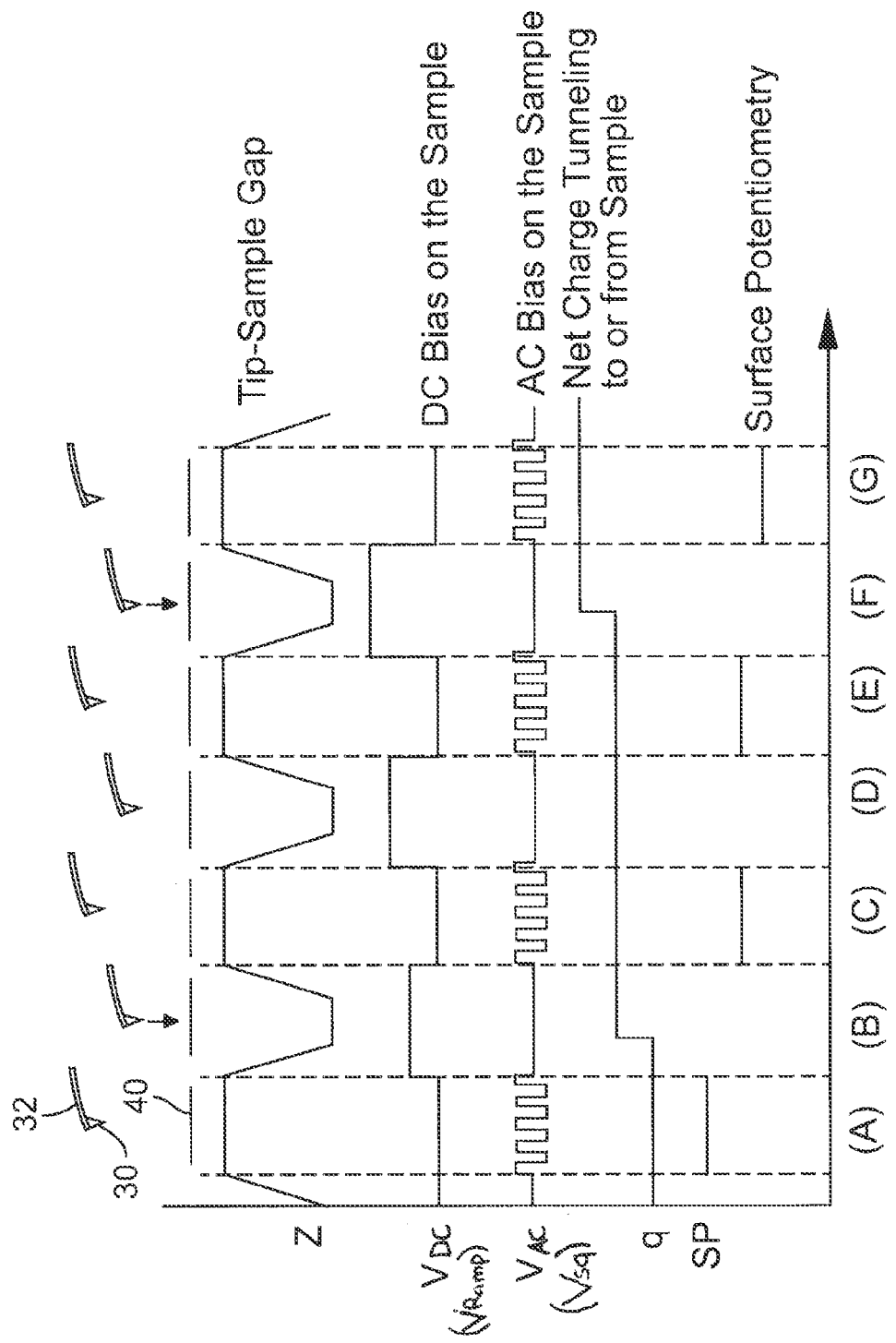
FIG. 9 is a diagram illustrating an exemplary relationship of the changes in applied voltage with the changes in the tip-sample gap and tunneling charge, demonstrating an exemplary methodology for performing SETFS measurements.

In order to increase the accuracy of the surface potential measurements, an exemplary method to perform spectroscopic measurements with equal sensitivity at all tunneling voltages has been developed and is discussed with reference to FIG. 9. However, it will first be appreciated that the surface potential of the sample dielectric material 30 may vary from location to location. Accordingly, in some embodiments, it may be advantageous to determine any nascent or initial surface potential difference between the probe tip 12 and the sample dielectric material 30 at each new location before voltage runs at any probe height are undertaken. A flat-band or bias DC voltage can then be applied from the voltage supply 26 to the sample dielectric material 30 (or the probe tip 12) during the subsequent measurement runs at the location to compensate for the initial surface potential difference. The flat-band voltage may be set to a value that causes the potential difference between the probe tip 12 and the location on the surface of the sample dielectric material 30 to be zero. However, the potential difference may be set to any desirable predetermined value by appropriately adjusting the flat-band voltage. Measurement runs at each location can be interrupted to update a nascent surface potential reading as desired to address possible drift during the measurement runs.

With reference again to FIG. 9, The tip-sample gap versus applied voltage diagram of FIG. 9 provides an illustration of exemplary steps (A)-(G) of SETFS scans at different tip-sample voltages. Toward the top of FIG. 9, the probe tip 12 is pictorially shown to be either in or out of tunneling range of the sample dielectric material 30. The graph of Z (with trapezoidal portions) indicates movement of the probe tip 12 to set its height with respect to the surface of the sample dielectric material 30. In measurement steps (A), (C), (E), and (G), the $V_{AC}$ is turned on at a selected waveform to measure the surface potential with the probe tip 12 at a predetermined height just outside of tunneling range. The $V_{AC}$ is then turned off and the $V_{Ramp}$ voltage is turned on. The steps (B), (D), and (F) show sequential increases in the applied $V_{Ramp}$ voltage. However, as noted earlier, multiple measurement cycles may be made at the same probe tip gap before the applied $V_{Ramp}$ voltage is ramped to a new value. It will be appreciated that the $V_{Ramp}$ voltage ramp may start at a high initial value and decrease in value instead of increasing in value from a low initial value. The probe tip 12 is lowered to gap Z within tunneling range, and the applied $V_{Ramp}$ voltage induces tunneling. The probe tip 12 is then retracted to the predetermined height beyond tunneling range for remeasuring the surface potential. If an electron has tunneled, the surface potential measured before and after tunneling will be different. The difference in surface potential is proportional to the amount of charge that has tunneled to or from the surface. The q graph indicates the charge injected into the dielectric surface during tunneling attempts. The measurement of surface potential is carried out at the same tip-sample gap. The measured surface potential does not depend on the applied tunneling voltage. The graph SP indicates the measured surface potential. The charge under the probe tip 12 is inferred from the surface potential, so that a spectrum of where the tunneling events have occurred can be found by plotting surface potential versus the applied DC bias (flat-band) voltage. It will be appreciated that FIG. 9 is illustrative for positive $V_{Ramp}$ voltages, but the general correlation of waveforms would be similar for negative $V_{Ramp}$ voltages.

Figure 10:
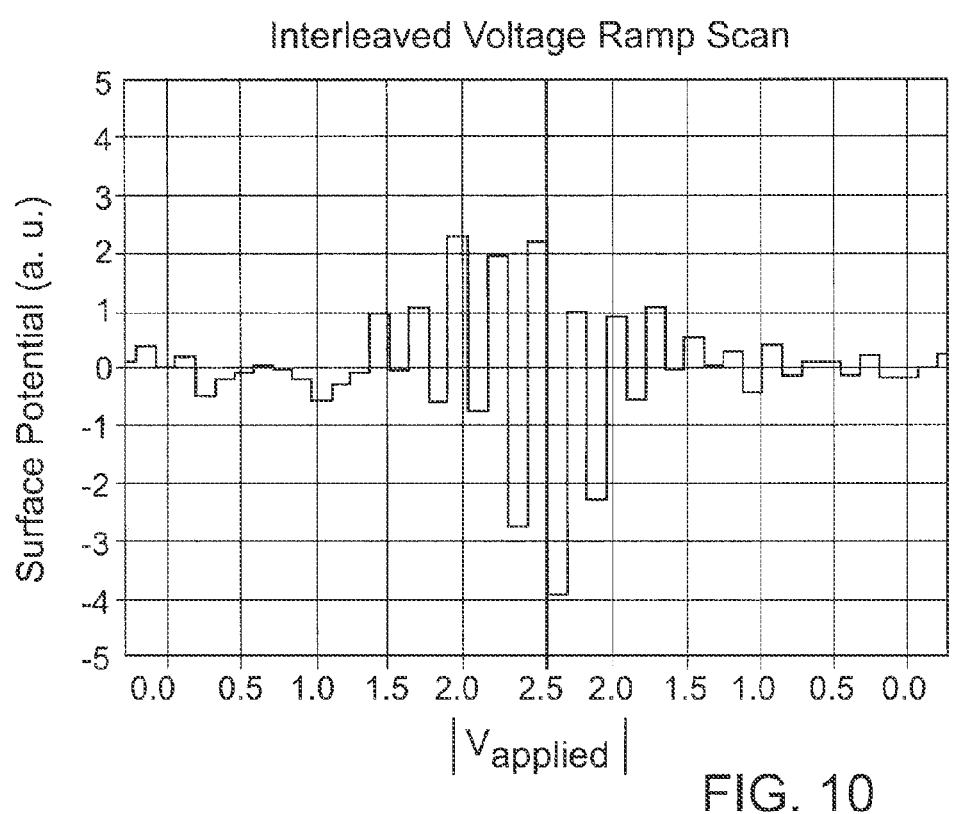
FIG. 10 illustrates some additional measured surface potential data with respect to the magnitude of an applied bipolar voltage.

In another example, FIG. 10 is a graph of surface potential plotted against the magnitude of the voltage applied to a sample dielectric material 30 of 4 nm of $HfSiO_x$ over 0.7 nm of $SiO_2$. The data was acquired over a single point or location on the sample dielectric material 30. By ramping the applied voltage and alternating the sign of the voltage (switching the polarity) each time the probe tip 12 comes within tunneling range of the sample dielectric material 30, the integrated density of trap states on either side of the flat-band equilibrium condition can be found by plotting the surface potential against each applied voltage value. The left half of the interleaved voltage ramp represents a voltage ramp both from 0 to +2.5 and from 0 to −2.5 volts. Many electrons may shuttle (more than 1 electron) each time the voltage polarity is reversed, indicating that there are many states within tunneling range of the probe tip 12. The tunneling calculations show that when the tip-sample gap is 0.4 nm, tunneling can occur to states that are as far as 4 nm below the surface of the $HfSiO_x$ sample dielectric material 30. Therefore, the spectroscopy measurements are sampling the entire volume of the $HfSiO_x$ film above the 0.7 nm $SiO_2$ layer.

These examples provide for embodiments of some general and concise SETFS methodology. In some embodiments for example, methods for characterizing electronic trap states in a dielectric material may comprise some or all of the following steps: providing a probe tip 12 attached to a cantilevered probe 14, the probe tip 12 having a metallic material 44; oscillating the cantilevered probe 14 at an amplitude and a frequency; positioning the probe tip 12 at a non-tunneling height beyond electron tunneling range at a first location on the dielectric material 30; determining a flat-band voltage between the probe tip 12 and the dielectric material 30; adjusting electrical potential at the probe tip 12 to be at the flat-band voltage; employing a height control feedback loop 60 to establish a true distance between the probe tip 12 and the dielectric material 30 at the first location; moving the probe tip 12 to a non-tunneling height beyond the electron tunneling range at the first location on the dielectric material 30; measuring a first baseline surface potential between the probe tip 12 and the dielectric material 30 at the first location; applying a first voltage between the probe tip 12 and the dielectric material 30 at the first location; using the true distance to determine a first height of the probe tip 12 relative to the first location on the dielectric material 30; positioning the probe tip 12 at the first height within electron tunneling range relative to the first location on the dielectric material 30 to attempt electron tunneling at the first voltage between the probe tip 12 and the dielectric material 30 from the first height at the first location; moving the probe tip 12 to a non-tunneling height beyond the electron tunneling range at the first location on the dielectric material 30; measuring at the first location a first surface potential associated with attempted electron tunneling from the first height at the first location at the first voltage; applying a second voltage between the probe tip 12 and the dielectric material 30 at the first location, wherein the second voltage is different from the first voltage; positioning the probe tip 12 at the first height within electron tunneling range relative to the first location on the dielectric material 30 to attempt electron tunneling at the second voltage between the probe tip 12 and the dielectric material 30 from the first height relative to the first location; moving the probe tip 12 to a non-tunneling height beyond the electron tunneling range at the first location on the dielectric material 30; measuring at the first location a second surface potential associated with attempted electron tunneling from the first height relative to the first location at the second voltage; applying the first voltage between the probe tip 12 and the dielectric material 30 at the first location; positioning the probe tip 12 at a second height within electron tunneling range at the first location on the dielectric material 30 to attempt electron tunneling at the first voltage between the probe tip 12 and the dielectric material 30 from the second height at the first location, wherein the second height is different from the first height; moving the probe tip 12 to a non-tunneling height beyond the electron tunneling range at the first location on the dielectric material 30; measuring at the first location a first surface potential associated with attempted electron tunneling from the second height at the first location at the first voltage; applying a second voltage between the probe tip 12 and the dielectric material 30 at the first location; positioning the probe tip 12 at the second height within electron tunneling range at the first location on the dielectric material 30 to attempt electron tunneling at the second voltage between the probe tip 12 and the dielectric material 30 from the second height at the first location; moving the probe tip 12 to a non-tunneling height beyond the electron tunneling range at the first location on the dielectric material 30; measuring at the first location a second surface potential associated with attempted electron tunneling from the second height at the first location at the second voltage; moving the probe tip 12 to the non-tunneling height beyond the electron tunneling range at a second location on the dielectric material 30, wherein the second location is different from the first location; measuring at the second location a second baseline surface potential between the probe tip and the dielectric material 30 at the second location; applying the first voltage between the probe tip 12 and the dielectric material 30 at the second location; positioning the probe tip 12 at the first height within electron tunneling range at the second location on the dielectric material 30 to attempt electron tunneling at the first voltage between the probe tip 12 and the dielectric material 30 from the first height at the second location; moving the probe tip 12 to a non-tunneling height beyond the electron tunneling range at the second location on the dielectric material 30; measuring at the second location a first surface potential associated with attempted electron tunneling from the first height at the second location at the first voltage; applying the second voltage between the probe tip 12 and the dielectric material 30 at the second location; positioning the probe tip 12 at the first height within electron tunneling range at the second location on the dielectric material 30 to attempt electron tunneling at the second voltage between the probe tip 12 and the dielectric material 30 from the first height at the second location; moving the probe tip 12 to a non-tunneling height beyond the electron tunneling range at the second location on the dielectric material 30; measuring at the second location a second surface potential associated with attempted electron tunneling from the first height at the second location at the second voltage; applying the first voltage between the probe tip 12 and the dielectric material 30 at the second location; positioning the probe tip 12 at a second height within electron tunneling range at the second location on the dielectric material 30 to attempt electron tunneling at the first voltage between the probe tip 12 and the dielectric material 30 from the second height at the second location; moving the probe tip 12 to a non-tunneling height beyond the electron tunneling range at the second location on the dielectric material 30; measuring at the second location a first surface potential associated with attempted electron tunneling from the second height at the second location at the first voltage; applying a second voltage between the probe tip 12 and the dielectric material 30 at the second location; positioning the probe tip 12 at the second height within electron tunneling range at the second location on the dielectric material 30 to attempt electron tunneling at the second voltage between the probe tip 12 and the dielectric material 30 from the second height at the second location; moving the probe tip 12 to a non-tunneling height beyond the electron tunneling range at the second location on the dielectric material 30; and measuring at the second location a second surface potential associated with attempted electron tunneling from the second height at the second location at the second voltage.

The order of these steps can be varied, and some of these steps may be repeated between other steps at regular or irregular intervals. In particular, the step of determining a flat-band voltage and the step of employing a height control feedback loop 60 may be repeated as desired to compensate for drift. Moreover, these methodologies can be performed with or without a height control feedback loop 60. The height control feedback loop can be implemented before or after positioning the probe tip 12 at a selected location and/or at various times at each selected location, such as at each new height, or each new voltage, as previously described.

Regardless of embodiment, the general system for measurement of depth and energy of buried trap states may be built in, and operate under, an ultrahigh vacuum (UHV) environment to eliminate some charge/current leakage paths created by ultrathin water layers or other contamination that may exist on dielectric or other surfaces, including the tip as well as the sample, under ambient conditions. Suitable UHV systems known in the art can be adapted or employed, including those commercially available from UHV STM or AFM vendors. Other modifications that eliminate leakage current may be desirable.

The system, however, is not limited to UHV environments and can be modified for other operating environments. For example, an operating environment such as air, argon, or other inert gases can be employed. Special probes may be used which are hydrophobic on their surface to minimize the effects of water, especially under non-UHV operating conditions. Also, a temperature greater than 100° C. can be used to eliminate the effects of water.

An experimental and theoretical methodology for independently determining the energy and depth of buried individual trap states at respective locations on a sample dielectric material 30, such as an $HfO_2$ film, has been described and demonstrated with the data presented herein. By combining the energy-depth SETFS methodology with two-dimensional state imaging provided by dynamic tunneling force microscopy (DTFM) (see Johnson, J. P.; Zheng, N.; Williams, C. C. *Nanotechnology* 2009, 20, 055701), one can achieve quantitative three-dimensional mapping of the spatial location of trap states with atomic scale spatial resolution along with a determination of state energy. This capability opens a new door to study and understand the four-dimensional (energy and spatial) distribution of atomic scale defects in electronic materials.

Figure 5:
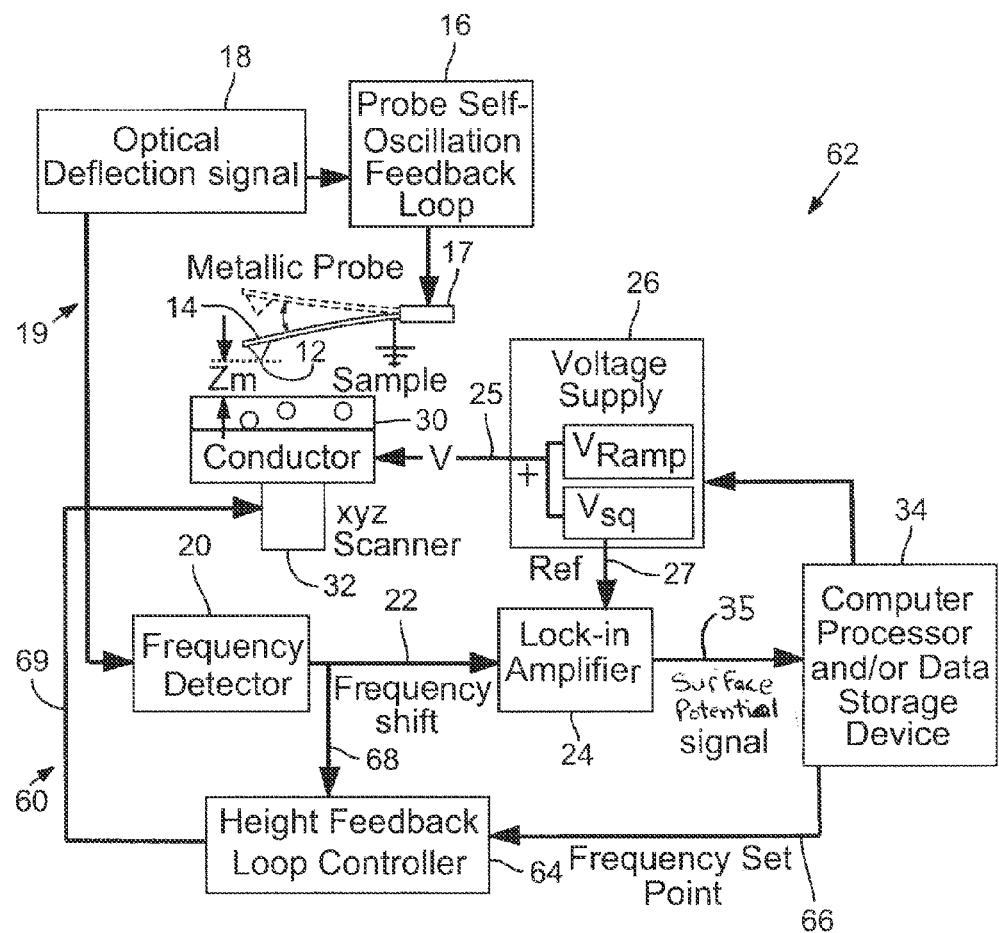
FIG. 5 is a simplified diagram of an SETFS system employing a height control feedback loop.
Figure 11:
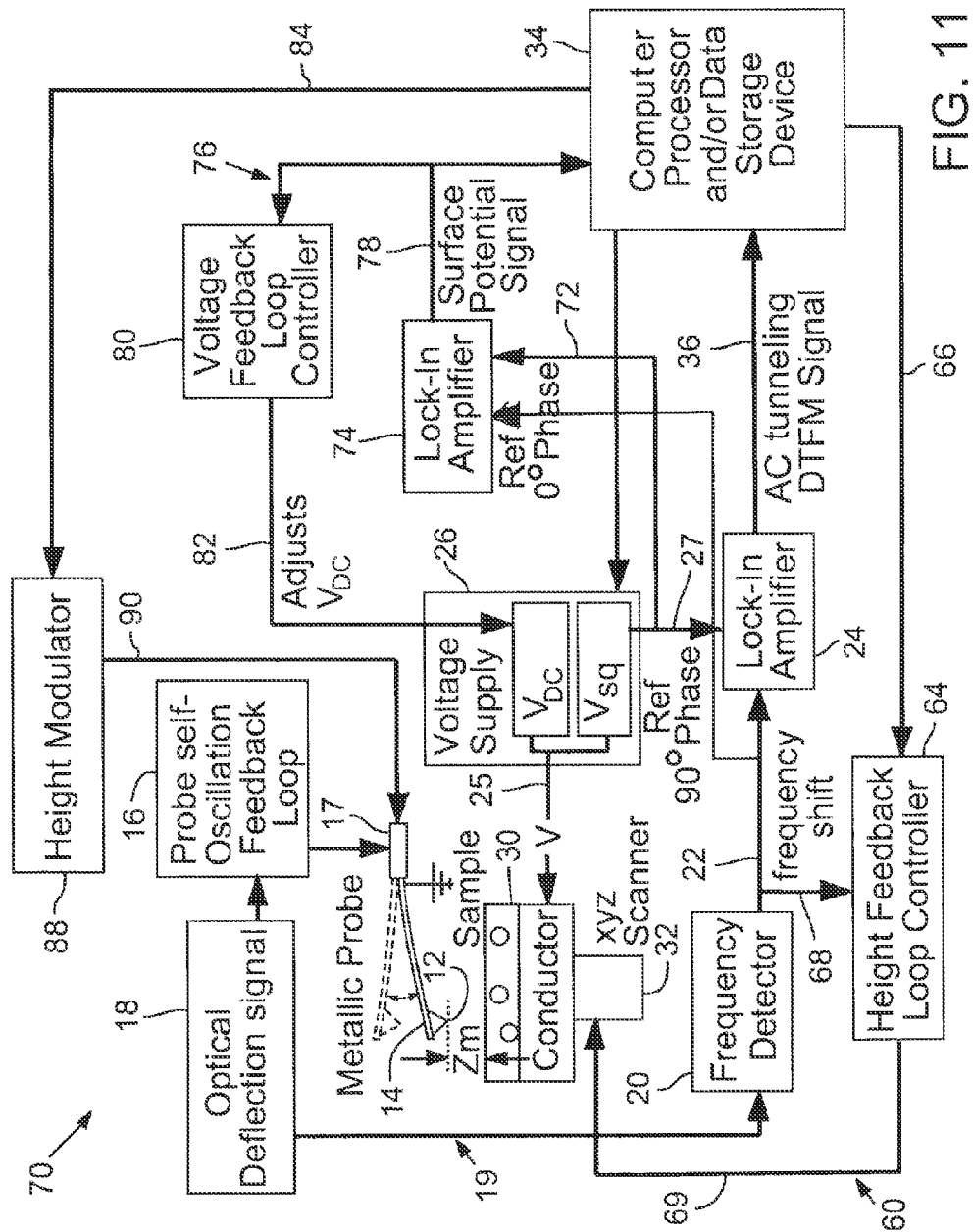
FIG. 11 is a simplified diagram of a dynamic tunneling force microscopy (DTFM) system.

FIG. 11 shows an exemplary DTFM system 70 that includes many analogous components of the SETFS system 62 shown in FIG. 5. The analogous components are labeled with the same reference numerals for convenience. With reference to FIGS. 5 and 11, several of the differences can be elucidated. In particular, the voltage supply 26 provides a quasi DC voltage ($V_{DC}$) component instead of the $V_{Ramp}$ component. For convenience the quasi DC voltage may be referred to as DC voltage or $V_{DC}$. The $V_{DC}$ component functions to adjust the average voltage on the sample during DTFM measurements to compensate for surface potential variations at different locations so that the height control feedback loop 60 will not be compromised by surface potential variations on the sample dielectric material 30. Thus, the applied voltage delivered along electrical line 25 provides the sum of the $V_{DC}$ component and the $V_{sq}$ component. Furthermore, the $V_{sq}$ reference voltage signal 27 delivered to the lock-in amplifier 24 should be phase shifted by 90 degrees.

The voltage supply 26 also delivers a $V_{sq}$ reference voltage signal 72 (zero degrees phase shifted) to a lock-in amplifier 74 which forms part of a voltage feedback loop 76. The voltage feedback loop 76 permits the DTFM system 70 to keep the probe tip 12 at the same surface potential as the surface potential of the surface of the sample dielectric material 30. In particular, the lock-in amplifier 74 outputs a surface potential signal 78 that is proportional to the difference between the surface potential of the probe tip 12 and the surface potential of the sample dielectric material 30. The surface potential signal 78 from the lock-in amplifier 74 is sent to a voltage feedback loop controller 80 (proportional, integral, or differential), where the surface potential is compared to a set point (in this example the set point may be zero). The voltage feedback loop controller 80 then sends a DC feedback adjustment signal 82 to the voltage supply 26, which adds an additional DC voltage along electrical line 25 applied to the sample dielectric material 30 to compensate for differences in surface potential between probe tip 12 and the sample dielectric material 30. Moreover, the feedback adjustment signal 82, therefore, permits the voltage feedback loop 76 to adjust the voltage applied to the sample dielectric material 30 so that the lock-in amplifier 74 always reads zero (or some other predetermined voltage), for example, so that the probe tip surface potential will be maintained at the same surface potential as the selected location on the surface of the dielectric material 30. By keeping the probe tip 12 at the same surface potential as the sample dielectric material 30, the DTFM system 70 or the composite system 100 (FIG. 14) can eliminate or compensate for background charge variations and anomalies so that height control of the probe tip 12 relative to the surface of the sample dielectric material 30 can be effective.

The DTFM system 70 also may include a probe height modulator 88 that receives a control signal 84 and provides a probe-gap modulation signal 90 ($Z_m$) to the mechanical actuator 17 of probe 14 to provide an oscillation frequency of the probe height that is two times the frequency of the $V_{sq}$ provided by the voltage supply 26 to the sample dielectric material 30. It will be appreciated that the oscillation of the probe 14 at or near its resonance frequency as provided by the probe self-oscillation feedback loop 16 is distinct from the oscillation frequency of the probe height provided by the probe height modulator 88, and that these frequencies may have very different values and may be applied to the probe 14 concurrently. In one example, the probe self-oscillation feedback loop 16 may provide a frequency of hundreds of kilohertz and the probe height modulator 88 may provide a frequency of hundreds of hertz. Moreover, an exemplary frequency provided by the probe height modulator 88 may be between 50 Hz and 50 kHz or between 100 Hz and 1 kHz, and an exemplary amplitude may be between 1 nm and 5 nm.

Figure 12:
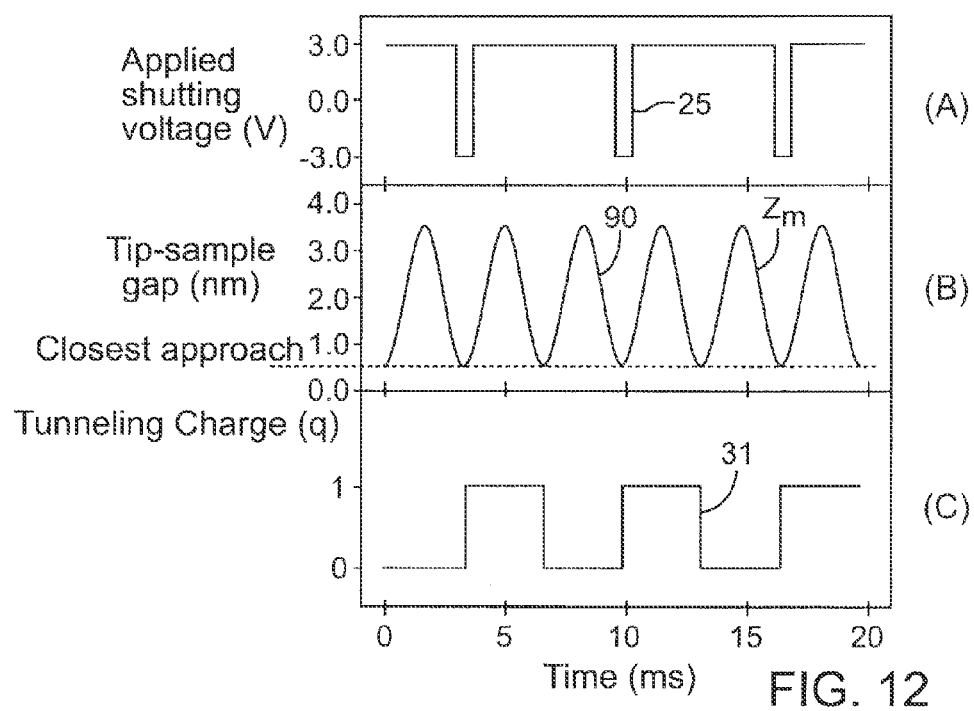
FIG. 12 illustrates exemplary DTFM timing waveform relationships of shuttling voltage, height modulation, and tunneling charge.

With respect again to the DTFM system 70, FIG. 12 illustrates exemplary DTFM timing waveform relationships of (A) the applied voltage 25 (which is the sum of $V_{DC}$ and $V_{sq}$ and may further include an adjustment voltage from the voltage feedback loop 76) and (C) tunneling charge 31 correlated with changes in (B) the gap height (Zm) between the probe tip 12 and the sample dielectric material 30. With reference to FIGS. 11 and 12, an exemplary waveform (A) of the applied voltage 25 from the voltage supply 26 is applied to the sample dielectric material 30. An AC voltage of the probe-gap modulation signal 90 applied to the probe 14 moves the probe tip 12 into and out of tunneling range to correlate with changes in the current waveform of the applied voltage 25. Each time the probe tip 12 is brought into tunneling range, the polarity of the applied voltage 25 is switched so that electrons are shuttled to and/or from the sample dielectric material 30. The lock-in amplifier 24 permits low frequency charge fluctuations at the surface of the sample dielectric material 30 (not caused by shuttled electrons) to be filtered out, leaving a DTFM signal 36 that is sensitive only to changes happening at the frequency of the applied voltage 25.

Figure 13:
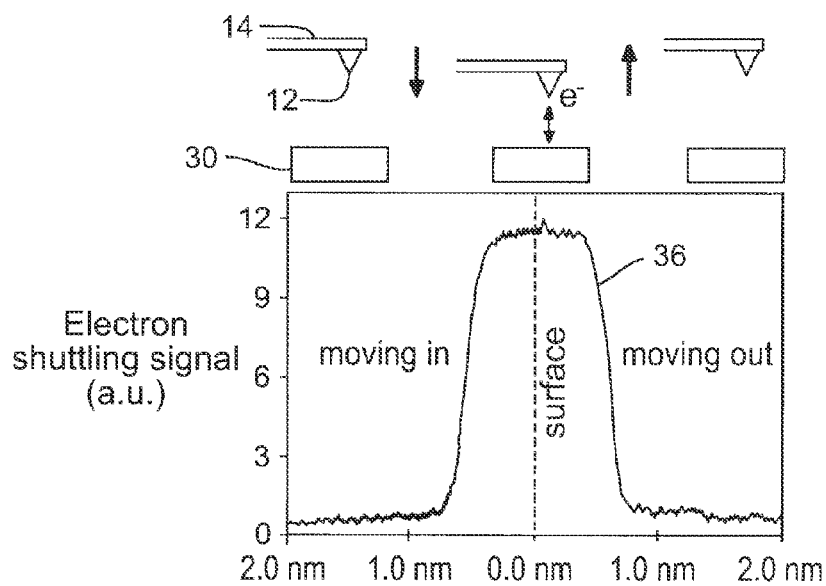
FIG. 13 is an exemplary graph of a DTFM signal showing electron tunneling versus the gap height of the probe tip above the sample.

The DTFM signal 36 is proportional to the number of electrons that are shuttling as shown in FIG. 13, which is an exemplary graph of electron tunneling (atomic units) versus the gap height (Zm) of the probe tip 12 above the sample dielectric material 30. FIG. 13 illustrates that as the probe tip 12 is brought close enough to the surface of the sample dielectric material 30 so that electron shuttling is consistent, the DTFM signal 36 rises. The DTFM signal 36 then falls as the probe tip 12 is brought out of tunneling range.

With the DTFM correlated waveforms applied, the probe tip 12 is raster scanned laterally over the surface of the sample dielectric material 30 to obtain a map of the DTFM signal 36 at each point. Such a DTFM shuttling map provides an image of the density of available trap states that are within tunneling range for the applied voltage range ($V_{DC}$) used to shuttle the electrons. It will be appreciated that the output voltage 82 of the voltage feedback loop controller 80 can be sent to the computer 34 to acquire a surface potential image when the voltage feedback loop controller 80 is turned on.

Although the DTFM shuttling map can be obtained before or after the SETFS methodology is performed in separate DTFM and SETFS systems, in exemplary embodiments the DTFM shuttling map can be obtained first with the composite DTFM-SETFS system 100. Then, the DTFM shuttling map is used to provide the two-dimensional spatial location of the trap states that can be further evaluated by the SETFS methodology described herein. Finally, the depth and energy data obtained through the SETFS methodology can be correlated with the two-dimensional spatial information provided by the DTFM shuttling map as later described.

Figure 14:
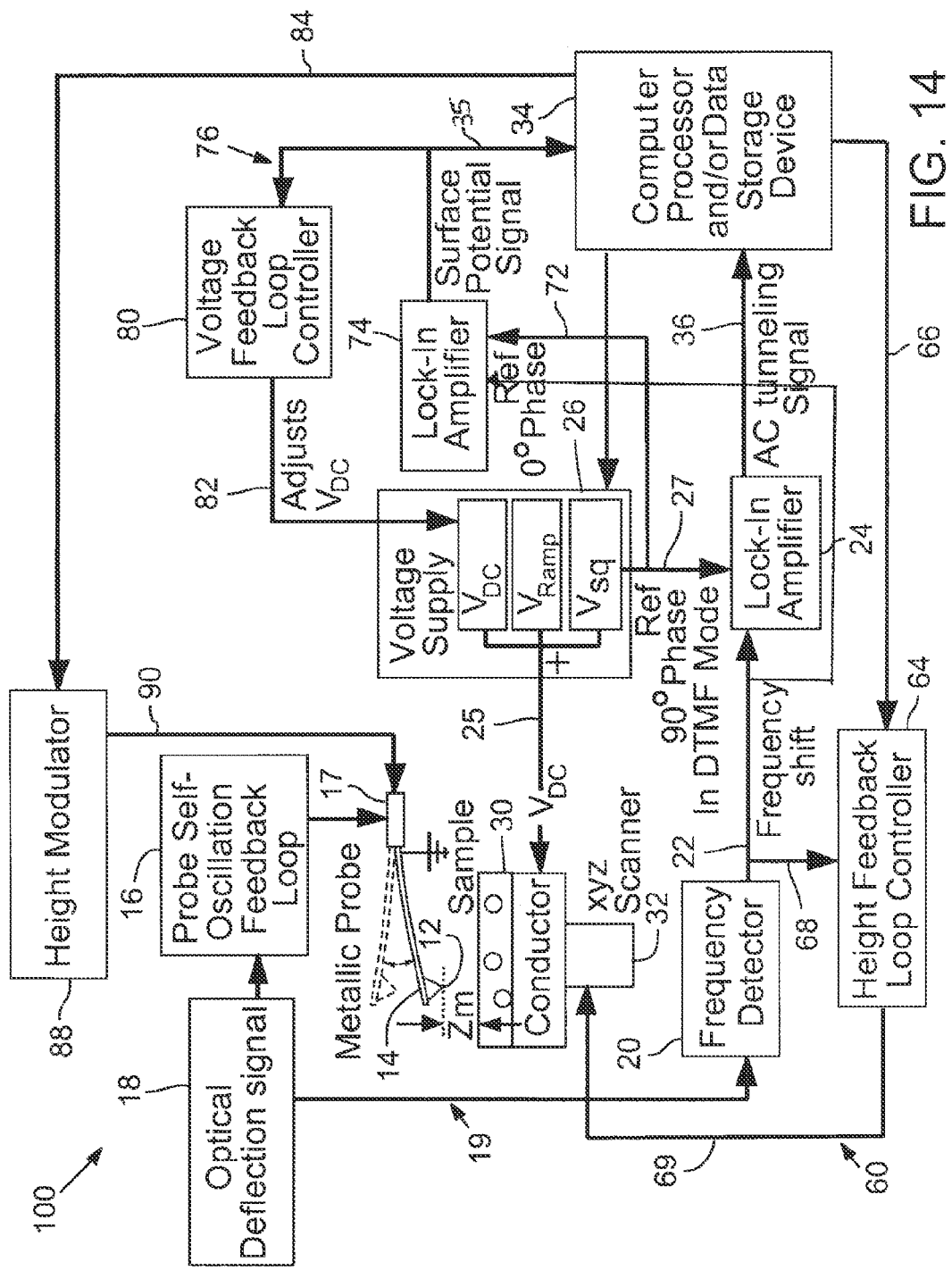
FIG. 14 is a simplified diagram of an exemplary composite DTFM-SETFS system.

An exemplary composite DTFM-SETFS system 100 is shown in FIG. 14 and includes all of the components from both the DTFM system 70 and the SETFS system 62. The composite DTFM-SETFS system 100 may also include additional switching components or alternative signal paths so that the composite DTFM-SETFS system 100 can operate in separate DTFM and SETFS modes that utilize the components and particularly any switches or dedicated signal paths, specific to the separate modes.

The correlation of the depth and energy data obtained through the SETFS methodology with the two-dimensional spatial information provided by the DTFM shuttling map can be accomplished through various known correlation techniques. In particular, techniques used to display three-dimensional magnetic resonance imaging (MRI) can be adapted for correlation of the SETSFS and DTFM data. Exemplary correlated DTFM-SETFS data can be presented as cross-sectional planes or three-dimensional maps. With the DTFM methodology providing the x and y two-dimensional data and the SETFS methodology providing the z height and energy data. Moreover, the energy data can be presented through use of different colors or numerical indicators. Other options for data presentation would be known to those having skill in the art with the aid of the present disclosure.

Additional details concerning height control feedback for SETFS can be found in the concurrently filed international application for "Method for Height Control for Single Electron Tunneling Force Spectroscopy and Dynamic Tunneling Force Microscopy" of the inventors Clayton Covey Williams and Jon Paul Johnson, which is herein incorporated by reference.

Another way to implement the spectroscopic voltage scans would be to utilize dynamic tunneling force spectroscopy, such as described in "Atomic Scale Imaging and Spectroscopy of Individual Electron Trap States Using Force Detected Dynamic Tunneling," by Johnson, J. P.; Zheng, N.; Williams, C. C. *Nanotechnology* 2009, 20, 055701 and U.S. Pat. No. 7,420,106, which is herein incorporated by reference. This adaptation would have the benefit of performing the voltage spectroscopy measurement at a higher speed, avoiding the surface potential measurements, applications of tunneling voltage, and inward and outward probe tip movements at each voltage step. The previous depth-energy methodology would apply except that dynamic tunneling force spectroscopy would be used instead of the slower stepped voltage spectroscopy.

It will be obvious to those having skill in the art that many changes may be made to the details of the above-described embodiments without departing from the underlying principles of the invention. The scope of the present invention should, therefore, be determined only by the following claims.

The invention claimed is:

1. A method for characterizing electronic trap states at multiple locations in a dielectric material, comprising:
   providing an oscillating probe tip operable for electron tunneling;
   making respective surface potential measurements associated with respective electron tunneling attempts from each of multiple distances including at least different first and second distances between the probe tip and the dielectric material at a first location, and wherein some of the respective surface potential measurements associated with respective electron tunneling attempts at each of the first and second distances are associated with respective electron tunneling attempts at each of multiple applied voltages including at least different first and second voltages;
   making respective surface potential measurements associated with respective electron tunneling attempts from each of multiple distances including at least different third and fourth distances between the probe tip and the dielectric material at a second location that is different from the first location, and wherein some of the respective surface potential measurements associated with respective electron tunneling attempts at each of the third and fourth distances are associated with respective electron tunneling attempts at each of multiple applied voltages including at least different third and fourth voltages; and
   using the respective surface potential measurements to characterize energy and/or depth of the electronic trap states at the first and second locations in the dielectric material.

2. The method of claim 1, wherein electron tunneling is attempted at the first distance before electron tunneling is attempted at the second distance, and wherein the first distance is greater than the second distance.

3. The method of claim 1, wherein electron tunneling is attempted at the first distance before electron tunneling is attempted at the second distance, and wherein the second distance is greater than the first distance.

4. The method of claim 1, wherein the third distance is the same as the first distance, and wherein the fourth distance is the same as the second distance.

5. The method of claim 1, wherein the third voltage is the same as the first voltage, and wherein the fourth voltage is the same as the second voltage.

6. The method of claim 1, further comprising:
   employing a height control feedback loop to establish a true distance between the probe tip and the dielectric material at the first location; and
   using the true distance to determine a true position for the probe tip at the first distance.

7. The method of claim 6, wherein the height control feedback loop is disengaged whenever tunneling is attempted.

8. The method of claim 6, wherein the height control feedback loop is disengaged whenever surface potential measurements associated with tunneling are conducted.

9. The method of claim 6, wherein the first and second locations are nearest neighboring locations that are sequentially addressed, and wherein the height control feedback loop is employed at the first and second locations.

10. The method of claim 6, wherein the first location on the dielectric material has a nascent surface potential with respect to the probe tip, wherein a flat-band voltage is applied between the probe tip and the dielectric material to offset the nascent surface potential to a desired surface potential value, and wherein the height control feedback loop is engaged after the flat-band voltage is applied.

11. The method of claim 6, wherein the height control feedback loop is engaged immediately before or immediately after positioning the probe tip at the first location on the dielectric material.

12. The method of claim 6, wherein the oscillating probe tip oscillates at a frequency, and wherein the height control feedback loop bases determination of the true distance on a shift in the frequency.

13. The method of claim 12, wherein the determination of the true distance is based on a preselected feedback set point in an attractive mode.

14. The method of claim 12, wherein the determination of the true distance is based on a preselected feedback set point in a repulsive mode.

15. The method of claim 1, wherein the first distance is smaller than 4 nm.

16. The method of claim 1, wherein the first distance is greater than 0.1 nm.

17. The method of claim 1, wherein the first distance and the second distance constitute nearest neighboring distances, and wherein the nearest neighboring distances are less than 0.2 nm apart.

18. The method of claim 1, wherein the first distance and the second distance constitute nearest neighboring distances, and wherein respective tunneling attempts at the first and second distances are conducted before respective tunneling attempts are conducted at other ones of the multiple distances.

19. The method of claim 18 wherein respective tunneling attempts at the first and second voltages are conducted before respective tunneling attempts at the third and fourth voltages are conducted.

20. The method of claim 1, wherein the first voltage and the second voltage constitute nearest neighboring voltages, and wherein the nearest neighboring voltages are less than one volt apart.

21. The method of claim 1, wherein the first voltage and the second voltage constitute nearest neighboring voltages, and wherein respective tunneling attempts at the first and second voltages are conducted sequentially before respective tunneling attempts are conducted at other ones of the multiple voltages.

22. The method of claim 1, wherein the first voltage and the second voltage constitute nearest neighboring voltages, and wherein respective tunneling attempts at other ones of the multiple voltages are conducted between respective tunneling attempts conducted at the first and second voltages.

23. The method of claim 1, wherein the first voltage and the second voltage have opposite polarity.

24. The method of claim 1, wherein the electronic trap states are buried within the dielectric material.

25. The method of claim 1, wherein the first location on the dielectric material has a nascent surface potential with respect to the probe tip, and wherein a flat-band voltage is applied between the probe tip and the dielectric material to offset the nascent surface potential to a desired surface potential value.

26. The method of claim 25, wherein the first or second voltage includes the flat-band voltage.

27. The method of claim 25, wherein the flat-band voltage is at or near a voltage causing a minimum shift of the frequency of oscillation of the probe tip and/or wherein an associated lock-in amplifier for detecting a shift in frequency of oscillation of the probe tip caused by surface potential changes provides a zero signal output.

28. The method of claim 1, wherein the probe tip is attached to a cantilever arm and comprises a metallic material.

29. The method of claim 1, wherein making respective surface potential measurements associated with respective attempted electron tunneling at the first distance and first voltage at the first location further comprises:
    moving the probe tip to a non-tunneling height beyond electron tunneling range at the first location on the dielectric material;
    measuring at the first location a first baseline surface potential between the probe tip and the dielectric material at the first location;
    applying the first voltage between the probe tip and the dielectric material at the first location;
    positioning the probe tip at the first distance to attempt electron tunneling at the first voltage from the first distance at the first location;
    moving the probe tip to a non-tunneling height beyond electron tunneling range at the first location on the dielectric material; and
    measuring at the first location a first surface potential associated with attempted electron tunneling from the first distance at the first voltage at the first location.

30. The method of claim 29, wherein the non-tunneling height of the probe tip is as close to the surface as practical without causing electron tunneling.

31. The method of claim 1, wherein any combination of one or more of the following conditions are met: wherein the probe tip has an oscillation frequency of between 1 and 800 kHz or between 100 and 500 kHz and an amplitude of between 0.1 and 100 nm or between 20 and 60 nm, wherein a feedback loop has a set point of greater than 1 Hz or between 1 and 10 Hz or between −10 and 1 Hz, wherein a non-tunneling height is greater than about 2 nm or greater than about 3 nm or greater than about 4 nm or greater than about 5 nm, wherein a square wave applied to the dielectric material has a voltage range between +1/−1 V and +10/−10 V or between +2/−2 V and +5/−5 V and a frequency between 1 Hz and 100 kHz or between 100 and 500 Hz, wherein the first distance and the second distance have a difference of between 0.01 and 0.5 nm or between 0.05 and 0.3 nm, wherein the first voltage and the second voltage have a difference of between 0.01 and 3 V or between 0.5 and 2 V, wherein an electron tunneling measurement is attempted at least once or at least twice at each height and voltage at each of the first and second locations, wherein electron tunneling is attempted for at least 1 microsecond, wherein measurement of the surface potential occurs within 1 microsecond of each tunneling attempt or within 100 millisecond of each tunneling attempt, and/or wherein the tunneling and measuring steps are performed at a temperature between 1 and 1000 degrees Kelvin or at a temperature below 4 degrees Kelvin or at a temperature below 300 degrees Kelvin.

32. The method of claim 1, further comprising:
    calculating a differential injected charge corresponding to respective electron tunneling attempts at the first and second locations.

33. The method of claim 1, wherein calculating a differential injected charge for an energy-depth region associated with the first location employs general use of an depth-energy separation equation: $dQ = Q_{z,V} - Q_{z+1,V} - Q_{z,V-1} + Q_{z+1,V-1}$, where $Q_{z,V}$ is the surface potential difference before and after tunneling at a height z and voltage V.

34. The method of claim 1, wherein respective surface potential measurements associated with respective attempted electron tunneling at each of multiple voltages at the first distance and the first location occur in less than 1.5 minutes.

35. The method of claim 1, wherein multiple additional energy-depth regions are evaluated by repeating the steps of:
applying a given voltage between the probe tip and the dielectric material at a given location, the given voltage being different from the first or second voltages;
positioning the probe tip at a given distance within electron tunneling range relative to a given location on the dielectric material to attempt electron tunneling at the given voltage between the probe tip and the dielectric material from the given distance relative to the given location;
moving the probe tip to the non-tunneling height beyond tunneling range relative to the given location on the dielectric material; and
measuring at the given location a successive surface potential associated with attempted electron tunneling from the given distance relative to the given location at the given voltage.

36. The method of claim 1, wherein measuring surface potential includes applying a sinusoidal or square wave voltage between the probe tip and the dielectric material and monitoring changes in the resonance frequency of the probe tip.

37. The method of claim 1, wherein a first injected charge is correlated with the first surface potential associated with attempted electron tunneling from the first distance at the first location at the first voltage, wherein a second injected charge is correlated with the second surface potential associated with attempted electron tunneling from the first distance at the first location at the second voltage, wherein a third injected charge is correlated with the first surface potential associated with attempted electron tunneling from the second distance at the first location at the first voltage, wherein a fourth injected charge is correlated with the second surface potential associated with attempted electron tunneling from the second distance at the first location at the second voltage, wherein the first injected charge is greater than the sum of the second, third, and fourth injected charges, wherein the second injected charge is greater than the sum of the third and fourth injected charges, and wherein the third injected charge is greater than the fourth injected charge, the method further comprising:
calculating a differential injected charge associated with the first surface potential responsive to attempted electron tunneling from the first distance at the first voltage, wherein calculating the differential injected charge entails adding the fourth injected charge to the first injected charge and subtracting the second and third injected charges.

38. The method of claim 1, wherein dynamic tunneling force microscopy (DTFM) is performed on the dielectric material to determine two-dimensional locations of trap states in the dielectric material, including the first location and the second location, the method further comprising:
correlating the two-dimensional location of the trap state at the first location with respective data associated with the surface potentials measured at the first and second voltages at the first and second distances at the first location; and
correlating the two-dimensional location of the trap state at the second location with respective data associated with the surface potentials measured at the first and second voltages at the first and second distances at the second location.

39. The method of claim 1, further comprising one or more of the steps or parameters of any preceding claim or any combination of preceding claims, wherein such steps or parameters are not mutually exclusive.

40. A single electron tunneling force spectroscopy system, comprising:
a metallic cantilevered probe arm;
a metallic probe tip supported by the metallic cantilevered probe arm;
a mechanical actuator responsive to an alternating current source for oscillating the metallic cantilevered probe arm at a probe oscillation frequency;
a positioning system for relative positioning of a sample material to the probe tip;
a frequency shift detection system that is operable for detecting an oscillation frequency shift from the probe oscillation frequency in response to electron tunneling from the probe tip to the sample;
one or more voltage supplies for applying voltage to the sample, wherein the voltage applied includes a direct current to induce electron tunneling from the probe tip to the sample and a square wave voltage to facilitate measurement of electrical potential between the probe tip and the sample material;
a lock-in amplifier for receiving a reference signal correlated with the square wave voltage applied to the sample material, for receiving a first frequency shift signal from the frequency shift detection system, and for providing an electron tunneling signal indicative of electron tunneling from the probe tip to the sample; and
a height feedback loop controller for receiving a frequency set point for establishing a probe height value indicative of a true distance between the probe tip and the sample material, for receiving a frequency shift signal from the frequency shift detection system, and for providing a height feedback control signal to the positioning system to permit the positioning system to provide a selected distance between the probe tip and the sample material that is correlated with the true distance.

41. A composite single electron tunneling force spectroscopy and dynamic tunneling force microscopy system, comprising:
a metallic cantilevered probe arm;
a metallic probe tip supported by the metallic cantilevered probe arm;
a mechanical actuator for oscillating the metallic cantilevered probe arm at a probe oscillation frequency and probe oscillation amplitude;
a probe self-modulation feedback loop for maintaining oscillation of the metallic cantilevered probe arm at the probe oscillation frequency and the probe oscillation amplitude;
a positioning system for relative positioning of a sample material to the probe tip;
a frequency shift detection system that is operable for detecting an oscillation frequency shift from the probe oscillation frequency in response to electron tunneling between the probe tip and the sample;
one or more voltage supplies for applying voltage to the sample, wherein the voltage applied includes a square wave voltage to facilitate measurement of electrical potential between the probe tip and the sample material, wherein the voltage applied also includes a tunneling voltage to induce electron tunneling between the probe tip and the sample during a single electron tunneling mode, and wherein the voltage applied also includes a DC voltage that functions to adjust potential between the probe tip and the sample material;

a height modulator to modulate the height between the probe and sample during a dynamic force tunneling mode;

a first lock-in amplifier for receiving a reference signal correlated with the square wave voltage applied to the sample material, for receiving a first frequency shift signal from the frequency shift detection system, and for providing an electron tunneling signal indicative of electron tunneling between the probe tip and the sample;

a height feedback loop controller for receiving a frequency set point for establishing a probe height value indicative of a true distance between the probe tip and the sample material, for receiving a frequency shift signal from the frequency shift detection system, and for providing a height feedback control signal to the positioning system to permit the positioning system to provide a selected distance between the probe tip and the sample material that is correlated with the true distance;

a second lock-in amplifier for receiving a second reference signal correlated with the square wave voltage applied to the sample material;

a voltage feedback loop controller for receiving a surface potential signal directly or indirectly from the second lock-in amplifier and for providing a voltage feedback signal to one or more of the voltage supplies in order to cause adjustment of the DC voltage applied to the sample during the dynamic force tunneling mode; and a computer for receiving the electron tunneling signal indicative of electron tunneling between the probe tip and the sample and for providing signals directly or indirectly to one or more of the voltage feedback loop controller, the height modulator, the height feedback loop controller, and one or more voltage supplies.

42. A method for characterizing electronic trap states in a dielectric material, comprising:

providing a probe tip attached to a cantilever arm, the probe tip having a metallic material;

oscillating the cantilever arm at an amplitude and a frequency;

positioning the probe tip at a non-tunneling height beyond electron tunneling range at a first location on the dielectric material;

moving the probe tip to a non-tunneling height beyond the electron tunneling range at the first location on the dielectric material;

measuring at the first location a first baseline surface potential between the probe tip and the dielectric material at the first location;

applying a first voltage between the probe tip and the dielectric material at the first location;

positioning the probe tip at a first height within electron tunneling range relative to the first location on the dielectric material to attempt electron tunneling at the first voltage between the probe tip and the dielectric material from the first height at the first location;

moving the probe tip to a non-tunneling height beyond the electron tunneling range at the first location on the dielectric material;

measuring at the first location a first surface potential associated with attempted electron tunneling from the first height at the first location at the first voltage;

applying a second voltage between the probe tip and the dielectric material at the first location, wherein the second voltage is different from the first voltage;

positioning the probe tip at the first height within electron tunneling range relative to the first location on the dielectric material to attempt electron tunneling at the second voltage between the probe tip and the dielectric material from the first height relative to the first location;

moving the probe tip to a non-tunneling height beyond the electron tunneling range at the first location on the dielectric material;

measuring at the first location a second surface potential associated with attempted electron tunneling from the first height relative to the first location at the second voltage;

applying the first voltage between the probe tip and the dielectric material at the first location;

positioning the probe tip at a second height within electron tunneling range at the first location on the dielectric material to attempt electron tunneling at the first voltage between the probe tip and the dielectric material from the second height at the first location, wherein the second height is different from the first height;

moving the probe tip to a non-tunneling height beyond the electron tunneling range at the first location on the dielectric material;

measuring at the first location a first surface potential associated with attempted electron tunneling from the second height at the first location at the first voltage;

applying a second voltage between the probe tip and the dielectric material at the first location;

positioning the probe tip at the second height within electron tunneling range at the first location on the dielectric material to attempt electron tunneling at the second voltage between the probe tip and the dielectric material from the second height at the first location;

moving the probe tip to a non-tunneling height beyond the electron tunneling range at the first location on the dielectric material;

measuring at the first location a second surface potential associated with attempted electron tunneling from the second height at the first location at the second voltage;

moving the probe tip to the non-tunneling height beyond the electron tunneling range at a second location on the dielectric material, wherein the second location is different from the first location;

measuring at the second location a second baseline surface potential between the probe tip and the dielectric material at the second location;

applying the first voltage between the probe tip and the dielectric material at the second location;

positioning the probe tip at the first height within electron tunneling range at the second location on the dielectric material to attempt electron tunneling at the first voltage between the probe tip and the dielectric material from the first height at the second location;

moving the probe tip to a non-tunneling height beyond the electron tunneling range at the second location on the dielectric material;

measuring at the second location a first surface potential associated with attempted electron tunneling from the first height at the second location at the first voltage;

applying the second voltage between the probe tip and the dielectric material at the second location;

positioning the probe tip at the first height within electron tunneling range at the second location on the dielectric material to attempt electron tunneling at the second voltage between the probe tip and the dielectric material from the first height at the second location;

moving the probe tip to a non-tunneling height beyond the electron tunneling range at the second location on the dielectric material;

measuring at the second location a second surface potential associated with attempted electron tunneling from the first height at the second location at the second voltage;

applying the first voltage between the probe tip and the dielectric material at the second location;

positioning the probe tip at a second height within electron tunneling range at the second location on the dielectric material to attempt electron tunneling at the first voltage between the probe tip and the dielectric material from the second height at the second location;

moving the probe tip to a non-tunneling height beyond the electron tunneling range at the second location on the dielectric material;

measuring at the second location a first surface potential associated with attempted electron tunneling from the second height at the second location at the first voltage;

applying a second voltage between the probe tip and the dielectric material at the second location;

positioning the probe tip at the second height within electron tunneling range at the second location on the dielectric material to attempt electron tunneling at the second voltage between the probe tip and the dielectric material from the second height at the second location;

moving the probe tip to a non-tunneling height beyond the electron tunneling range at the second location on the dielectric material; and measuring at the second location a second surface potential associated with attempted electron tunneling from the second height at the second location at the second voltage.

* * * * *